(12) United States Patent
Merget et al.

(10) Patent No.: US 10,168,497 B2
(45) Date of Patent: Jan. 1, 2019

(54) SELF-ALIGNMENT FOR APPARATUS COMPRISING PHOTONIC DEVICE

(71) Applicant: RWTH Aachen, Aachen (DE)

(72) Inventors: Florian Merget, Würselen (DE); Jeremy Witzens, Köln (DE); Alvaro Moscoso-Martir, Aachen (DE)

(73) Assignee: RWTH Aachen (DE)

( * ) Notice: Subject to any disclaimer, the term of this patent is extended or adjusted under 35 U.S.C. 154(b) by 0 days.

(21) Appl. No.: 15/580,965

(22) PCT Filed: Jun. 15, 2015

(86) PCT No.: PCT/EP2015/063356
§ 371 (c)(1),
(2) Date: Dec. 8, 2017

(87) PCT Pub. No.: WO2016/202357
PCT Pub. Date: Dec. 22, 2016

(65) Prior Publication Data
US 2018/0180826 A1    Jun. 28, 2018

(51) Int. Cl.
*G02B 6/12*    (2006.01)
*G02B 6/42*    (2006.01)
*G02B 6/136*   (2006.01)

(52) U.S. Cl.
CPC ........... *G02B 6/423* (2013.01); *G02B 6/136* (2013.01)

(58) Field of Classification Search
CPC ................................. G02B 6/423; G02B 6/136
See application file for complete search history.

(56) References Cited

U.S. PATENT DOCUMENTS 5,721,797 A    2/1998  Basavanhally et al.
6,819,841 B2 * 11/2004  Germann ................. G02B 6/30
                                                    385/49
(Continued)

FOREIGN PATENT DOCUMENTS

DE    19644758 A1    4/1998
EP     0532470 A1    3/1993
(Continued)

OTHER PUBLICATIONS

Kapulainen et al., Hybrid Integration of InP Lasers with SOI Waveguides Using Thermocompression Bonding Sep. 17-19, 2008, 61-63, IEEE, Sorrento, Italy.
(Continued)

*Primary Examiner* — Ellen Kim
(74) *Attorney, Agent, or Firm* — Lerner, David, Littenberg, Krumholz & Mentlik, LLP

(57) ABSTRACT

An apparatus may include a photonic device with at least a first waveguide having a light-conducting core bounded by at least one cladding layer, at least a second waveguide having a light-conducting core bounded by at least one cladding layer, wherein the first waveguide is aligned to couple with the second waveguide, wherein alignment of the first waveguide with the second waveguide with respect to at least one axis C coincides with at least one stop area of the photonic device resting on a stop surface of a corresponding support structure on a substrate, wherein the stop area is a stop in a recess from a surface of the photonic device. A method to fabricate the apparatus may include the recess is formed by etching of the photonic device, and/or the support structure is formed by etching of the substrate.

11 Claims, 17 Drawing Sheets

(56) References Cited

U.S. PATENT DOCUMENTS

| | | | |
|---|---|---|---|
| 9,869,831 B2* | 1/2018 | Barwicz | G02B 6/4232 |
| 9,882,073 B2* | 1/2018 | Krasulick | H01L 31/02327 |
| 2011/0085760 A1* | 4/2011 | Han | G02B 6/423 |
| | | | 385/14 |
| 2014/0086528 A1 | 3/2014 | Yonezawa et al. | |
| 2014/0319656 A1 | 10/2014 | Marchena et al. | |
| 2016/0252688 A1* | 9/2016 | Barwicz | G02B 6/4238 |
| | | | 385/14 |
| 2018/0052290 A1* | 2/2018 | Kinghorn | G02B 6/131 |

FOREIGN PATENT DOCUMENTS

| | | |
|---|---|---|
| EP | 1122567 | 8/2001 |
| GB | 2379995 A | 3/2003 |

OTHER PUBLICATIONS

Shimizu, et al, Multichannel and high density hybrid integrated light source with a laser diode array on a silicon optical waveguide platform for interchip optical interconnection, Jun. 2014, vol. 2 No. 3, A19-A24.

Romero-Garcia et al, Edge Couplers With Relaxed Alignment Tolerance for Pick-and-Place Hybrid Integration of III-V Lasers With SOI Waveguides, Jul./Aug. 2014, J. Sel. Top. Quant. Electron. 204, 8200611, 11 pgs.

Hatori, et al,—A Hybrid Integrated Light Source on a Silicon Platform Using a Trident Spot-Size Converter, Apr. 1, 2014, 32(7), 1329-1336.

Almeids, et al, Nanotaper for compact mode conversion, Aug. 1, 2003 Opt. Lett. 28(15), 1302-1304.

International Search Report from PCT/EP2015/063356, dated Feb. 3, 2016, 3 pgs.

* cited by examiner

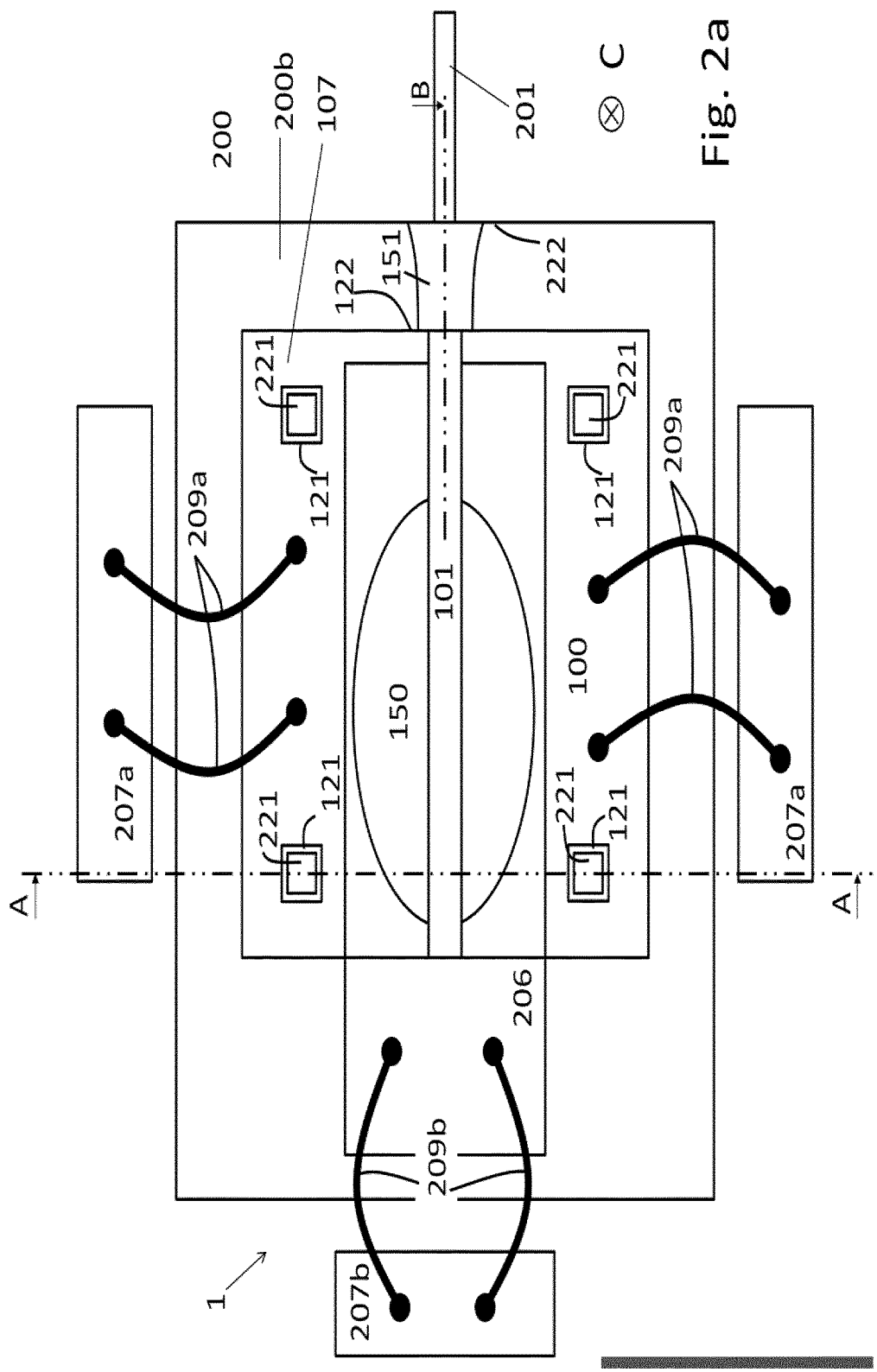

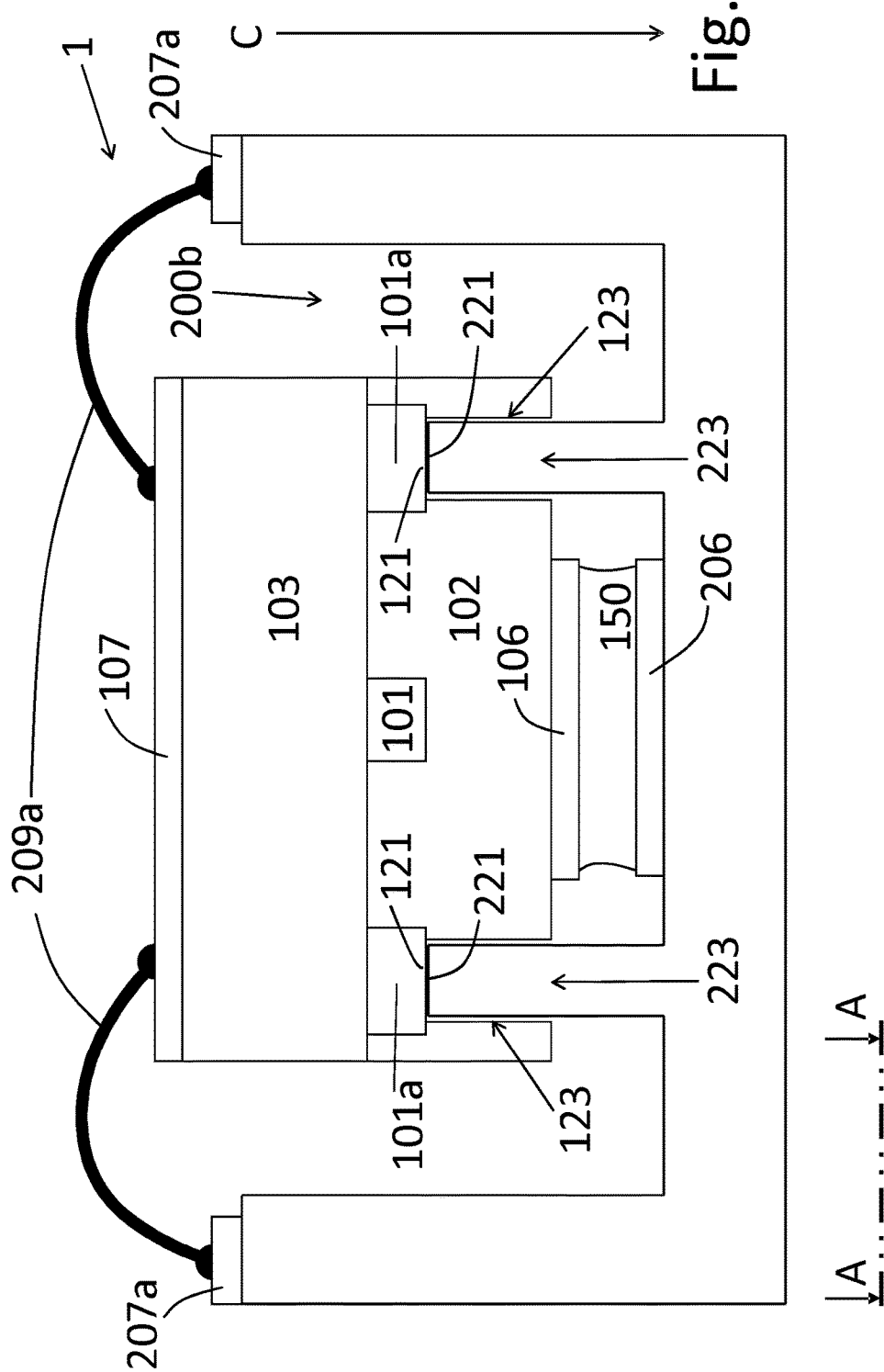

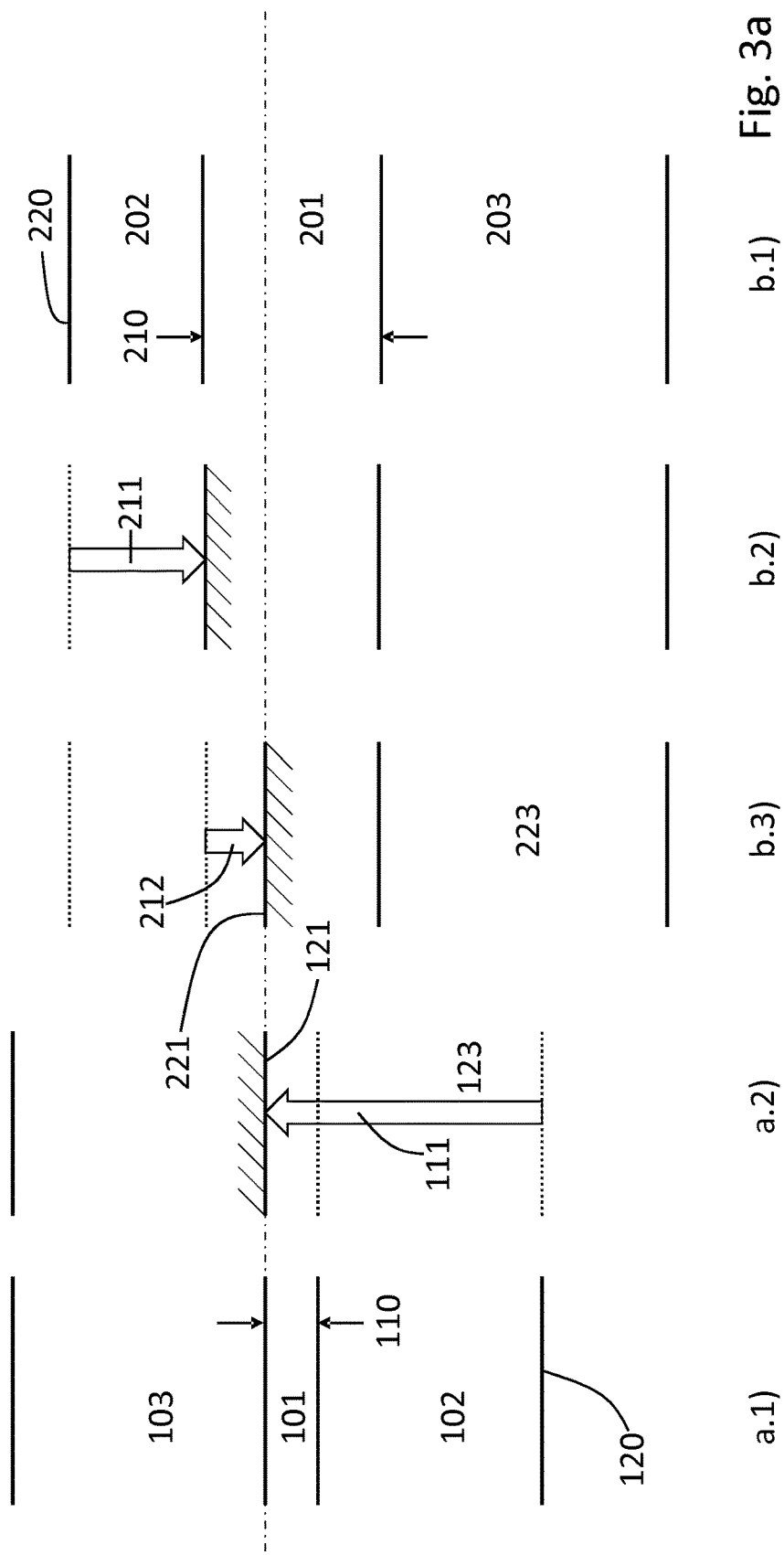

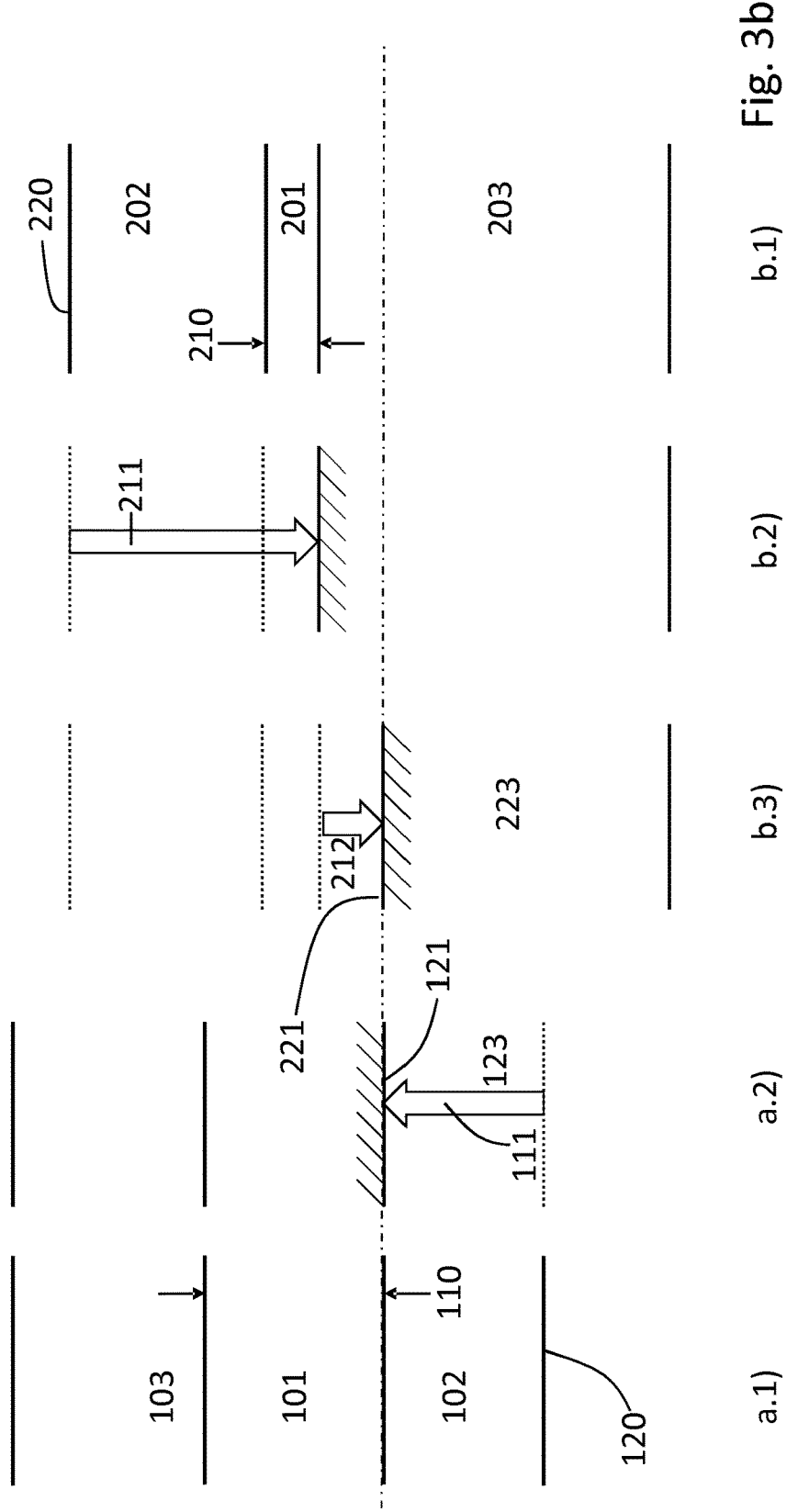

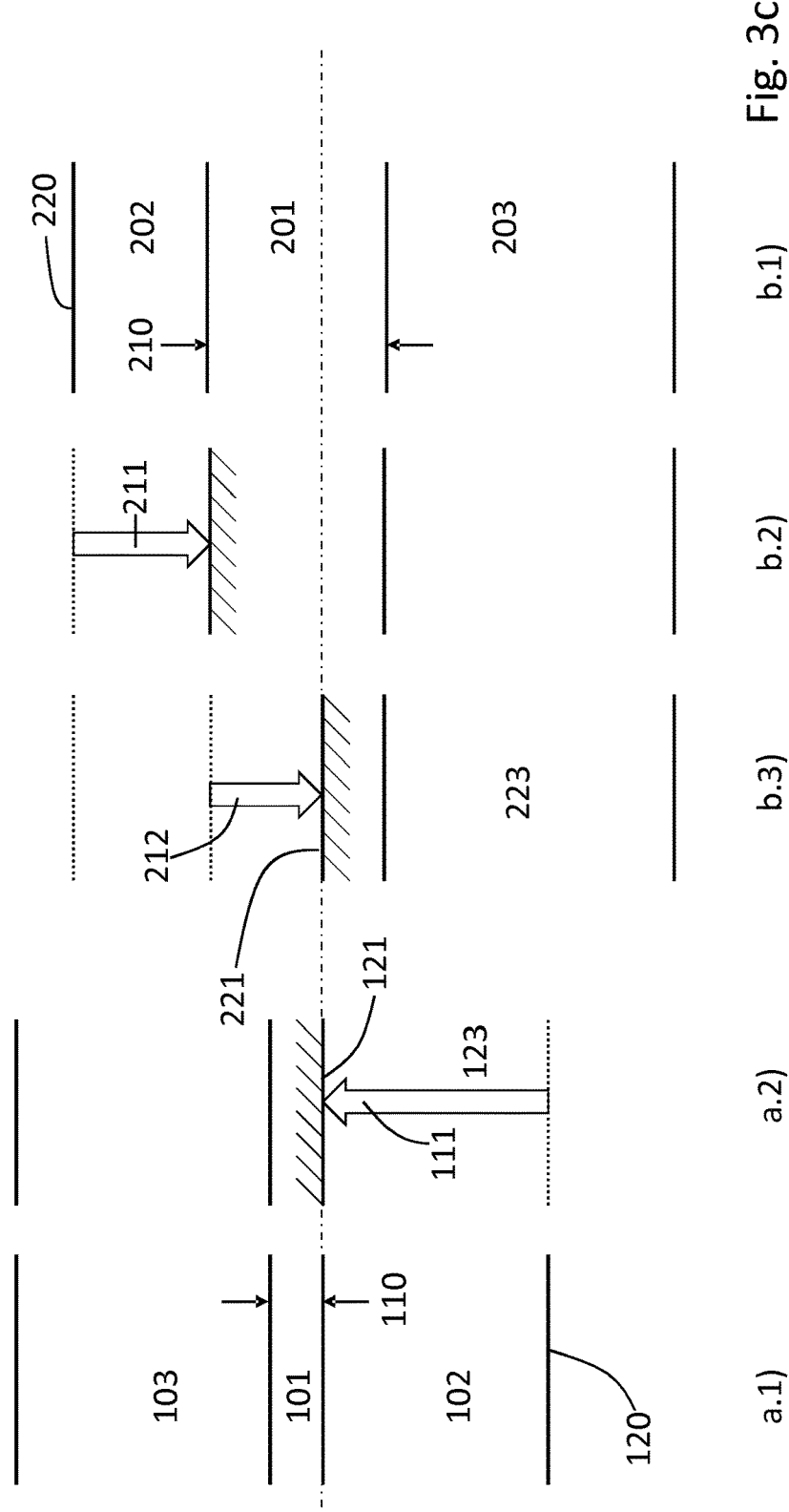

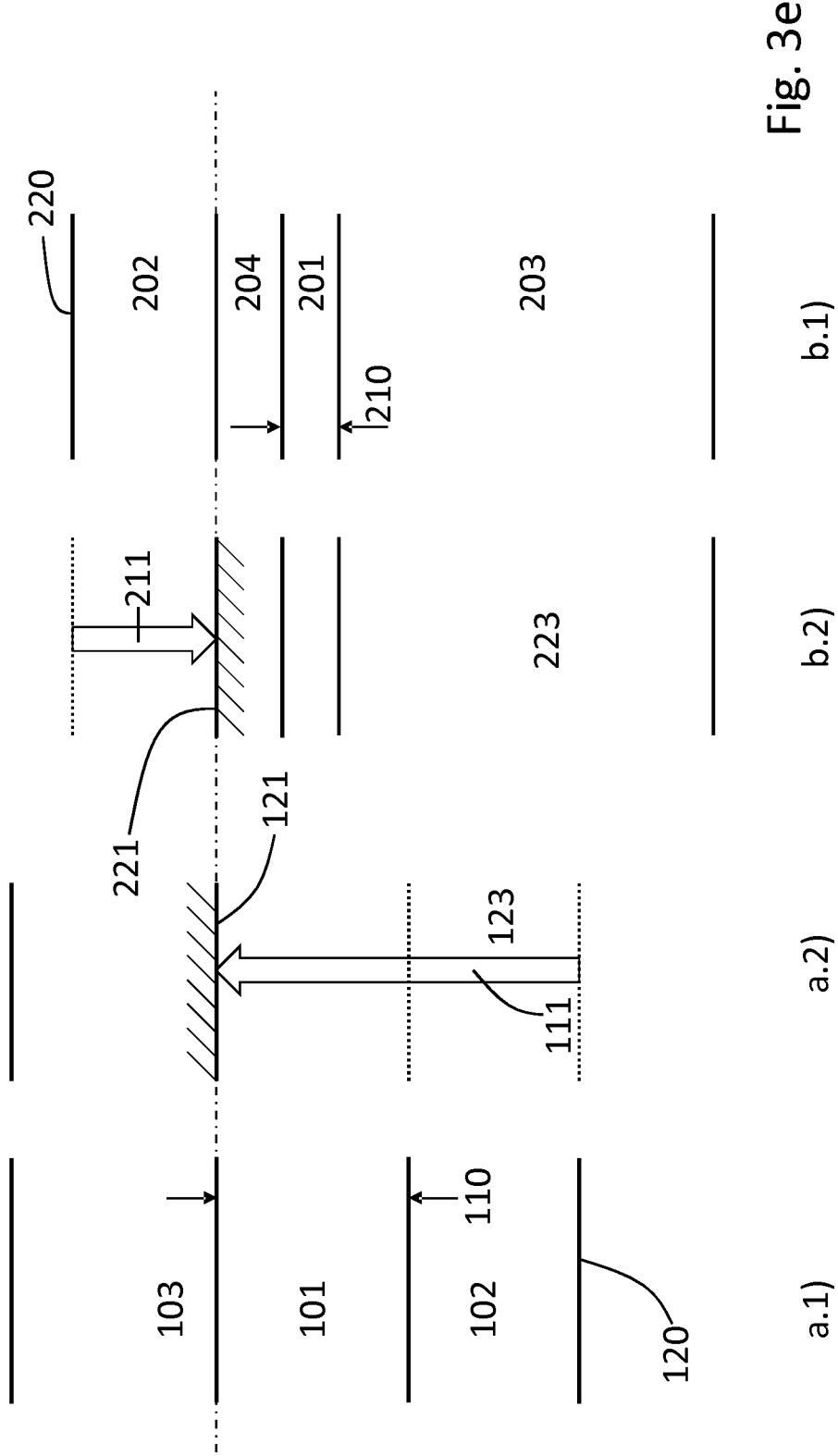

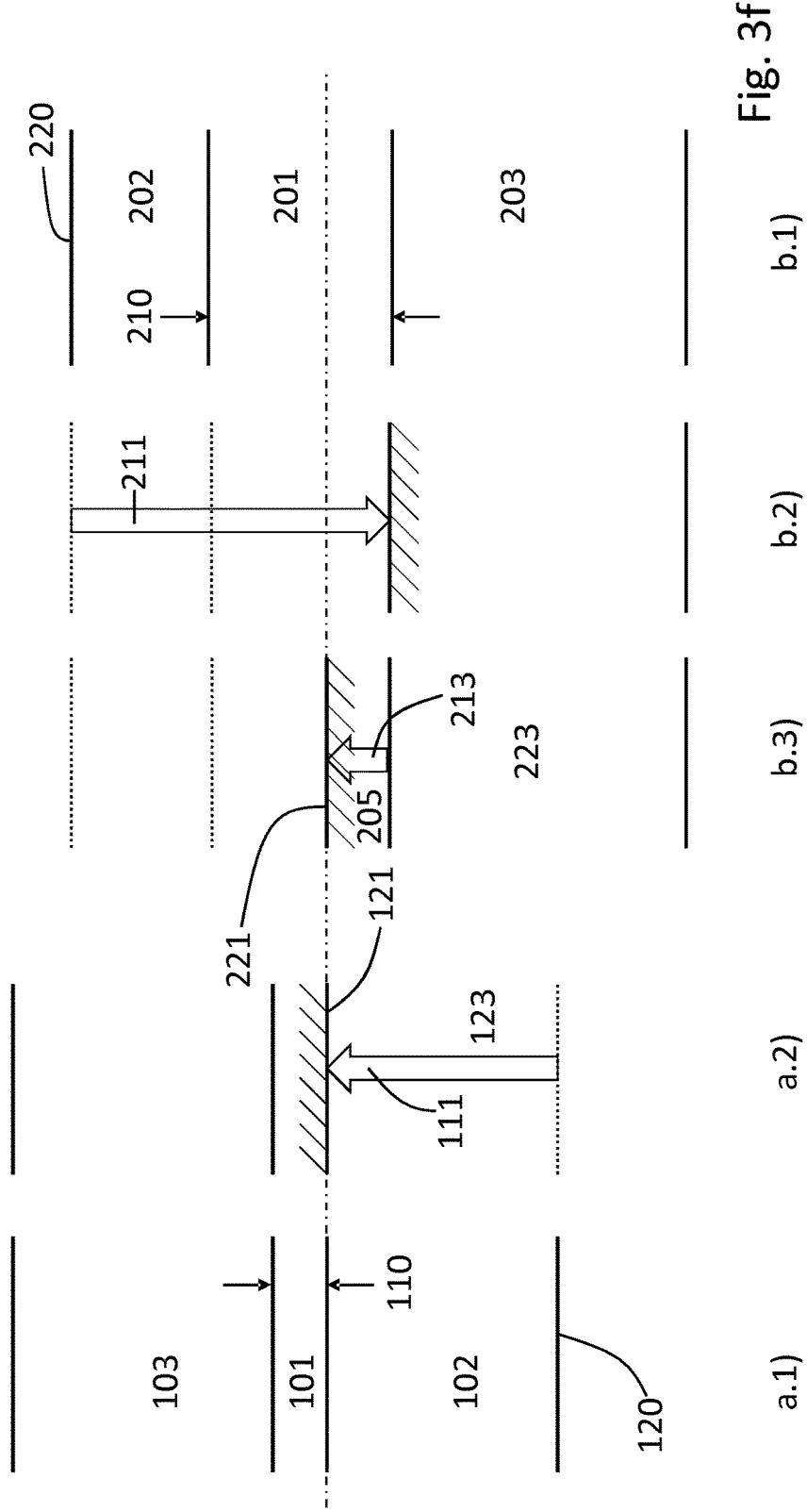

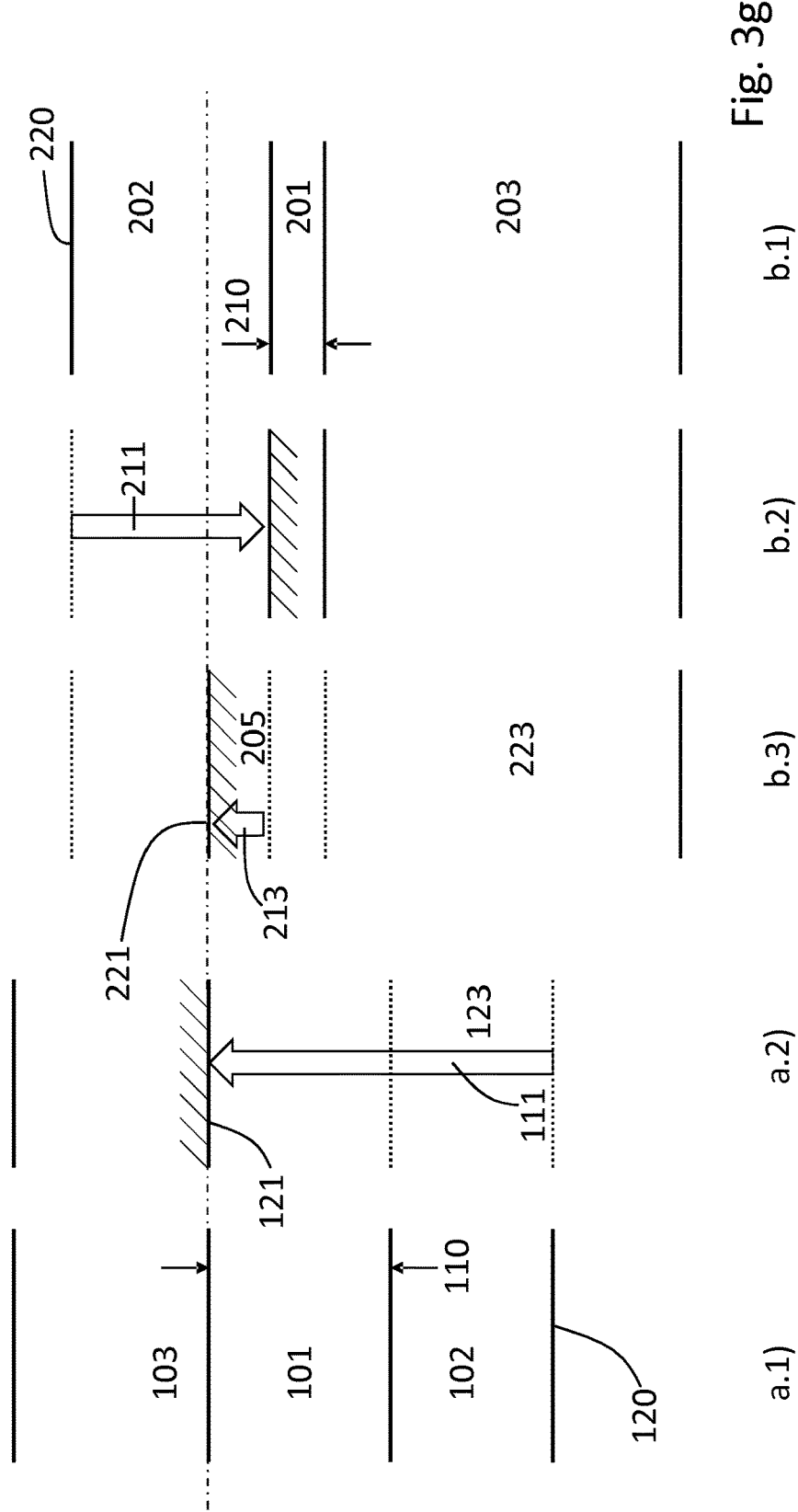

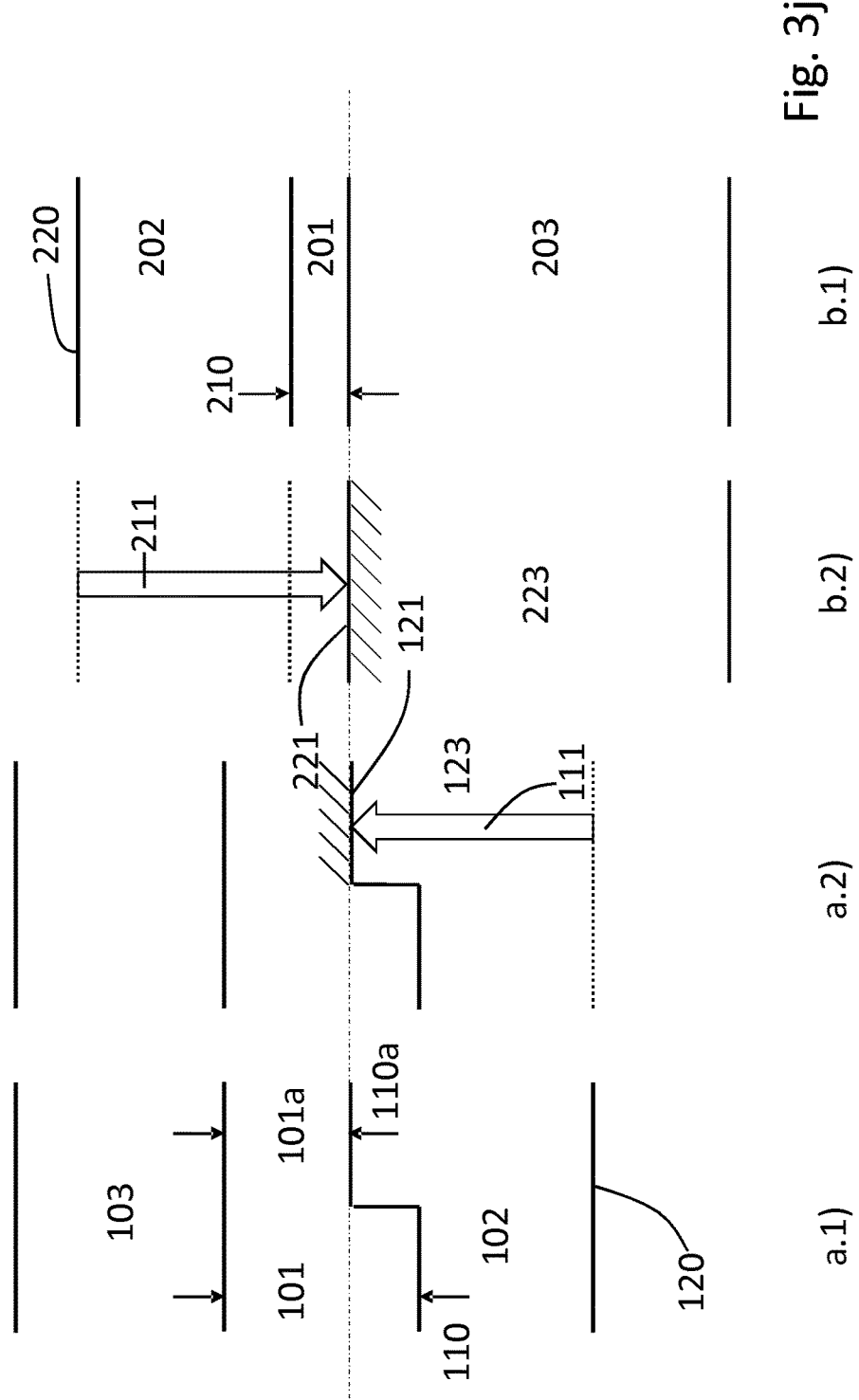

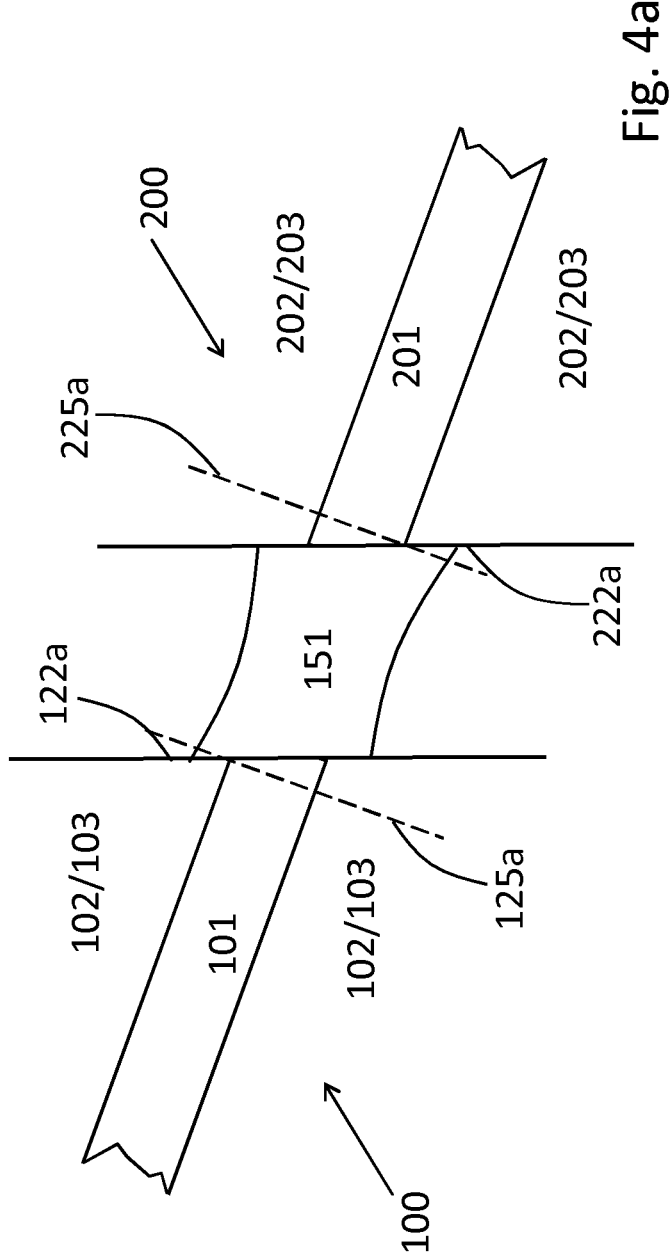

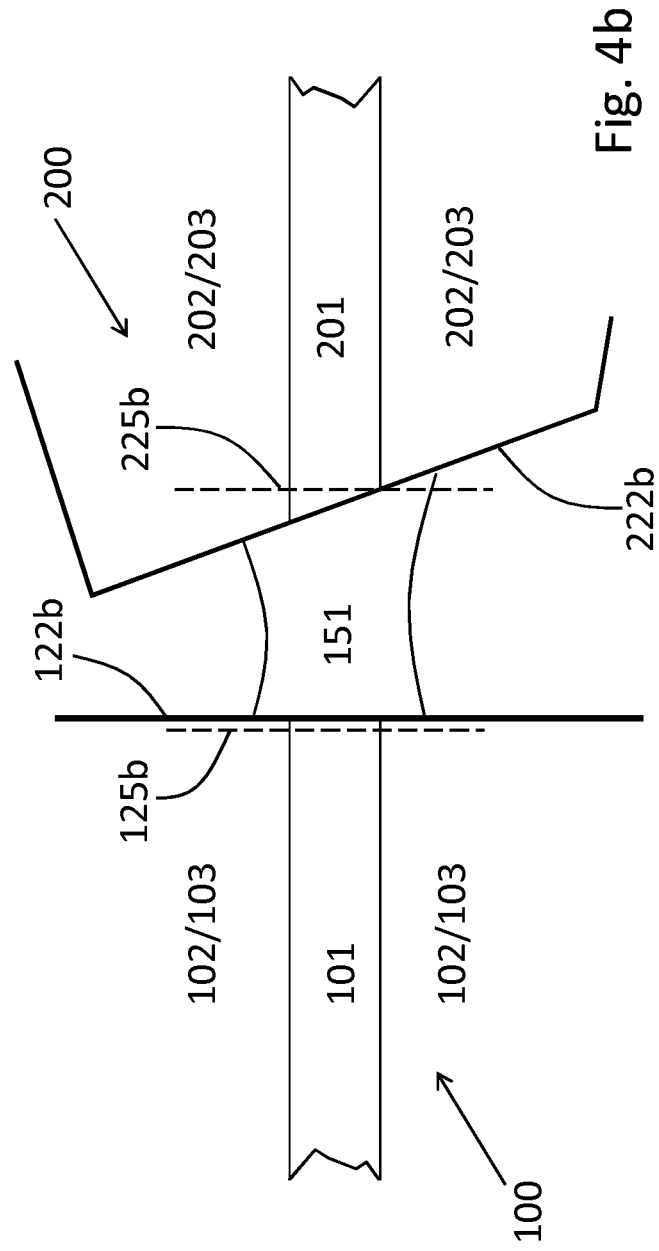

SELF-ALIGNMENT FOR APPARATUS COMPRISING PHOTONIC DEVICE

CROSS REFERENCE TO RELATED APPLICATIONS

The present application is a national phase entry under 35 U.S.C. § 371 of International Application No. PCT/EP2015/063356 filed Jun. 15, 2015, published in English, incorporated by reference herein.

The invention relates to an apparatus that comprises a photonic device with a first waveguide that is coupled to a second waveguide in a self-aligning way.

BACKGROUND OF THE INVENTION

A wide variety of optical circuits can be realized as a photonic integrated circuit (PIC) on a silicon or dielectric substrate. However, both photodetectors and light emitting devices (lasers, SOAs) are not readily available in a dielectric-based PIC. It is also not possible to realize efficient light emitting devices within a silicon-based PIC.

To equip a dielectric-based or silicon-based PIC with a photodetector, a light source or a similar photonic device, this photonic device is therefore manufactured separately on a different type of substrate as a flip-chip photonic chip (FCPC). When this chip is mounted onto the PIC, a first waveguide of the FCPC is coupled to a second waveguide of the PIC to make an optical connection between the two devices.

Due to the small cross-section of integrated photonic waveguides, the coupling between a PIC and a FCPC requires micrometer to sub-micrometer precision in their relative alignment. The efficiency of the coupling is quantified by the relation between the power of the light before the coupling (in the transmitting device) and after the coupling (in the receiving device). To achieve a good coupling between the two devices, they have to be positioned such that the beam sent by the transmitting device spatially matches the required field profile at the receiving device. Quantitatively, the overlap integral between the two has to be maximized.

Several assembly technologies have been utilized to couple a semiconductor laser to a PIC. In one assembly technology, the laser chip is prepackaged in an optical micro-bench or separate housing (laser subassembly) together with additional optical components such as an optical isolator, a ball lens, etc. and coupled to the PIC using fiber optics or by direct attachment of a micro-bench onto the PIC. The attachment process typically requires active alignment, i.e., the laser chip is emitting light into the PIC, the coupled power is measured and the position of the laser micro-bench or fiber modified until the optimum coupling position is found. The laser subassembly or fiber can then be permanently affixed to the PIC. The laser micro-bench or housing is a significant cost factor in this packaging scheme.

In a more cost effective assembly technology, the laser chip is attached directly onto the PIC chip using a flip-chip process (and is thus a flip-chipped photonic chip—FCPC). Here, the light is coupled directly from a waveguide of the laser chip (the laser stripe) to a waveguide of the PIC chip by being transmitted first through an edge facet of the laser chip and then through a facet of the PIC chip. The facet of the PIC chip can be fabricated by etching into the PIC, wherein a sidewall of the etch then forms the facet. The same assembly technology is used to assemble waveguide photodetectors on PIC chips, where the light is directly coupled from the PIC chip to the waveguide of the photodetector by being first transmitted through a facet of the PIC and then through an edge facet of the photodiode chip. Similarly, a semiconductor optical amplifier (SOA) can be flip-chipped onto a PIC, wherein light is first transmitted from a first PIC waveguide to the SOA and then from the SOA to a second PIC waveguide.

Waveguides on the FCPC and on the PIC can be simply terminated at the facet or slightly before the facet of the respective chip, thus forming a simple edge coupler. They can also be connected to edge couplers facilitating the coupling by expanding the mode size of the waveguides and thus relaxing the alignment tolerances. Such edge couplers can take the form of a taper, wherein the width of the waveguide is widened near the edge of the chip so as to broaden the mode profile, or the form of an inverse taper, wherein the width of the waveguide is reduced well below the single mode condition, reducing the optical confinement and increasing the mode dimensions both in the horizontal and vertical dimensions. Such edge couplers are well known in the art, for example from (V. R. Almeida, R. R. Panepucci, and M. Lipson, "Nanotaper for compact mode conversion," Opt. Lett. 28(15), 1302-1304 (2003)). In a more advanced edge coupler configuration, several inverse tapers can be merged and tapered down to a unique single mode waveguide, as is known from (N. Hatori, T. Shimizu, M. Okano, M. Ishizaka, T. Yamamoto, Y. Urino, M. Mori, T. Nakamura, Y. Arakawa, "A Hybrid Integrated Light Source on a Silicon Platform Using a Trident Spot-Size Converter," J. Lightwave Tech. 32(7), 1329-1336 (2014)). Edge couplers receiving a beam and coupling the light to more than one single mode waveguide, wherein such edge couplers have improved alignment tolerances relative to comparable edge couplers coupling the light to a unique single mode waveguide, are further known, for example from (S. Romero-Garcia, B. Marzban, F. Merget, B. Shen, J. Witzens, "Edge Couplers With Relaxed Alignment Tolerance for Pick-and-Place Hybrid Integration of III-V Lasers With SOI Waveguides," J. Sel. Top. Quant. Electron. 20(4), 8200611 (2014)).

Waveguides are formed by a core material, in which core material the light is guided, and one or more (optical) cladding materials with a lower refractive index, which cladding materials are arranged around the core material. Waveguides can for example be formed by fully or partially etching a higher refractive index thin film (the core layer) located on a lower refractive index material (forming the lower cladding layer), wherein an additional lower refractive index material can be deposited directly onto and around the higher refractive index core material after patterning of the core layer (forming the upper cladding layer). The edge couplers can be defined in the same core layer as the waveguides. In the case of a chip comprising active light-emitting devices such as lasers or SOAs, the core layer comprises light emitting structures such as quantum wells, quantum dots or quantum dashes. Such light emitting structures are formed by interleaving one or several very thin light emitting layers (the quantum wells, quantum dot layers or quantum dash layers) with electrical cladding layers. The very thin light emitting layers are typically thin enough to quantize the free electrical carrier wave functions and have a thickness on the order of a few nm. This thickness is too small to be resolved by the optical field, so that the latter sees an effective medium with an index corresponding to the average of the materials (light emitting layers and electrical cladding layers) weighted with the optical field strength. For this reason the entire stack of light emitting layers and electrical cladding layers is considered part of the (optical) core layer confining the light. The averaged index of the (optical) core layer remains higher than the refractive index of the (optical) cladding layers. Typically, the refractive index of the electrical cladding layer (that is part of the core layer) is also higher than the refractive index of the cladding layers. Waveguides on the PIC or the FCPC are preferentially designed to guide radiation (light) with frequencies between 30 and 1200 THz, wherein radiation with power at one or several said frequencies is transmitted in between the PIC and the FCPC. Typical thicknesses of the core layers on the PIC and FCPC range from 50 nm to 5 μm. Moreover, typical core layer thicknesses for devices at telecommunications wavelengths (C-band, L-band, O-band) range from 100 nm to 3 μm.

The waveguide mode of FCPCs comprising devices such as semiconductor lasers, SOAs or photodetectors can be several microns below the surface of the FCPC. For this reason, a cavity has to be typically etched into the PIC, in which cavity the photonic chip is subsequently flip-chipped. The depth of the cavity then determines the vertical alignment between the edge coupler on the FCPC and the edge coupler on the PIC, said depth thus being critical to enable good optical coupling. Such a flip-chip attachment method is for example known from (M. Kapulainen, S. Ylinen, T. Aalto, M. Harjanne, K. Solehmainen, J. Ollila, and V. Vilokkinen, "Hybrid Integration of InP Lasers with SOI Waveguides Using Thermocompression Bonding," Proc. 5$^{th}$ IEEE Int. Conf. on Group IV Photon., 61-63 (2008)). In this method, the top metallization layer of an active FCPC such as a laser, SOA or photodetector is in mechanical contact with the PIC or with adhesive layers deposited on the PIC.

An important drawback of this attachment method is that it is sensitive to thickness variations of the top metallization layer of the FCPC, as well as to thickness variations of additional adhesive materials placed, dispensed or deposited between the FCPC and the PIC. Since such thicknesses are typically ill controlled, respectively hard to precisely control, vertical alignment is challenging. For example, the exact thickness of metal electrodes defined by lift-off on laser diodes, SOAs or photodetectors are typically not specified and controlled by manufacturers of standard commercial components. The shrinkage of adhesives or microbumps also makes their height very hard to control with sufficient accuracy. A further drawback of this attachment method is that individual dust particles trapped between the PIC and the FCPC can very significantly deteriorate the vertical alignment.

In an improved flip-chip integration scheme, also known in the art from (T. Shimizu, N. Hatori, M. Okano, M. Ishizaka, Y. Urino, T. Yamamoto, M. Mori, T. Nakamura, Y. Arakawa, "Multichannel and high-density hybrid light source with a laser diode array on a silicon optical waveguide platform for interchip optical interconnection," Photon. Res. 2(3), A19-A24 (2014)), pedestals are fabricated inside the etched cavity, for example by not etching such pedestals while etching the rest of the cavity (e.g., with a masked etch following a lithography step), or by etching such pedestals to a lesser extent than the rest of the cavity. These pedestals are special support structures fabricated on the PIC device to predetermine the vertical position of the FCPC edge coupler with respect to the vertical position of the PIC edge coupler. The mechanical contact only occurs between the pedestal and the FCPC. This has several advantages: For example, the adhesive material can be dispensed only in locations at the bottom of the cavity that are etched to a higher extent, in which case the vertical alignment is not a function of the amount of dispensed adhesive. The same holds for other attachment schemes such as bump bonding, in which case the bump bonds are placed at locations at the bottom of the cavity. The vertical alignment is then also defined by the point contact(s) between pedestal(s) and FCPC and not by the bump bonds themselves. Shrinkage of the bump bonds or of the adhesive merely firmly holds the FCPC in mechanical contact with the pedestals. A further advantage is that this attachment method is much more tolerant to dust, as the actual mechanical contacts only cover a reduced portion of the total FCPC footprint and dust located elsewhere than on the top of the pedestals is unlikely to impact the vertical alignment. In order to provide electrical connectivity to the top surface of the FCPC (which is facing down in the final assembly), metal lanes, metal pads or metal surfaces can be defined at the bottom of the cavity. Conductive adhesives or bump bonds can then further provide electrical connectivity between the metal surface(s) at the bottom of the cavity and electrodes on the top surface of the FCPC.

Even this improved flip-chip integration scheme still has drawbacks, in that even the tops of the pedestals need to be etched by a significant amount (on the order of the cumulative thickness of the top cladding layers of the PIC and the top cladding layers of the FCPC). The variability of this etch is sufficient to substantially impact the vertical alignment accuracy. While the pedestals are etched to a lesser amount than the rest of the cavity, the top of the pedestals still typically needs to be etched by several microns relative to the top surface of the PIC. For example, for a typical laser diode chip the core of the laser waveguide is buried 3 μm underneath the surface. Thus, the top of the pedestals has to be etched 3 μm into the PIC substrate, assuming the PIC waveguide to be at the surface of the PIC. If the PIC waveguide is buried below a top cladding (typically 2-5 μm) the etching of the pedestals has to be even deeper, accordingly. Typical process variations during the deposition of thick layers or deep etching is up to 10%, i.e., the final vertical position of the FCPC edge coupler after assembly can vary by several hundreds of nanometers. Thus, in order to overcome this variability, the fabrication processes have to be extremely well controlled.

OBJECT OF THE INVENTION

It is therefore the object of the invention to improve the accuracy of the alignment with respect to at least one axis, and to facilitate the fabrication of a flip-chip integrated optical apparatus.

DISCLOSURE OF THE INVENTION

The inventors have developed an apparatus that comprises a photonic device with at least a first waveguide and that further comprises at least a second waveguide. The first waveguide has a light-conducting core bounded by at least one cladding layer. The second waveguide has another light-conducting core bounded by at least one cladding layer. The first waveguide is aligned to couple with the second waveguide. Alignment of the first waveguide with the second waveguide with respect to at least one axis C coincides with at least one stop area of the photonic device resting on a stop surface of a corresponding support structure on a substrate.

The term "waveguide" is not to be understood to mean that the dimensions of such a waveguide must fulfill the conditions for single mode propagation. It is only required that there is a light-conducting core of whatever dimensions bounded by at least one cladding layer. For example, the first waveguide, and/or the second waveguide, may also be waveguides that form part of an edge coupler. As explained in the "Background" section, a waveguide in which light is conducted through an edge coupler may, for example, be broadened well above the single mode condition, narrowed down far below the single mode condition, or multiple such waveguides may be merged into one waveguide, to relax alignment tolerances. For example, the actual photonic device may emit light through an edge coupler, which is brought into alignment with another edge coupler. In such a setting, the photonic device in the context of this invention may be a first edge coupler, and the substrate may be a second edge coupler. Thus, the invention may be used to connect arbitrary optical devices with high coupling efficiency.

According to the invention, the stop area is a stop in a recess from a surface of the photonic device. The contact between the stop area and the stop surface may be a mechanical point contact.

The inventors have found that this configuration is much easier to fabricate with high precision by etching than the configurations according to the prior art. The deeper an etching process is to proceed, the more difficult it is to control the final depth exactly. The configuration according to the invention can be fabricated by splitting the etching process in two: the recess can be fabricated by etching of the photonic device, while the support structure can be fabricated by etching of the substrate. The more the photonic device is etched, the less the substrate needs to be etched, and vice versa. This alone already improves the precision of the final alignment between the two waveguides.

In addition, the etches can be stopped at convenient locations. Such convenient locations are for example boundaries between thin films, wherein the difference in material properties between two such thin films results in a significant difference in etching rates and provides a natural etch stop.

The support structure may, for example, be a pedestal that sticks out from a surface of the substrate along the axis C with respect to which it provides an alignment between the first waveguide and the second waveguide. However, any structure with a surface that provides a stop for a relative movement of the photonic device against the substrate along said axis C will do. The support structure may, for example, stick out from a surface of the substrate that is parallel to said axis C and engage with a corresponding groove in the photonic device (100) that is parallel to said axis C as well. This groove then functions as the recess from the surface of the photonic device in which it is fabricated. The stop area inside the groove may, for example, be an end face of the groove. It may, however, also be a surface of a protrusion inside the groove.

The stop area in the recess of the photonic device can, for example, be the bottom of that recess. The support structure on the substrate can, for example, be a pedestal fabricated on the substrate, and the stop surface can be the top of this pedestal. However, both the stop area and the corresponding stop surface need not be planar. For example, the shape of the stop area can be the negative of the shape of the stop surface. The stop area and the stop surface can then engage with each other to form a stop for the relative movement of the photonic device against the substrate along the axis C.

Preferably, the support structure of the substrate is insertable into the recess of the photonic device by relative movement of the photonic device against the substrate along the axis C. Assembly of the apparatus from the photonic device and the substrate and alignment of the first waveguide with the second waveguide can then be combined into one simple step. In addition, insertion of the support structure of the substrate into the recess of the photonic device may also limit relative movement of the photonic device against the substrate along the two other axes A and B, providing at least a coarse alignment with respect to these axes A and B as well.

The photonic device may, for example, be one of a light source, a photodetector, or an optical amplifier. Preferably, the light source is a laser. The laser is preferably a semiconductor laser. The optical amplifier is preferably a semiconductor optical amplifier (SOA). The easy alignment along the axis C that is brought about by the invention then allows for an easy integration of such a photonic device into an optical assembly or test setup (e.g., as used for device or die sorting during manufacturing) by means of the coupling between the first waveguide and the second waveguide. This is most apparent in the case of the optical amplifier with at least two waveguides that need alignment with corresponding waveguides, especially if these waveguides terminate in opposite edges of the optical amplifier. The input and output waveguides of a reflective optical amplifier terminate in the same edge.

The photonic device is not required to contain active optical components. It can, for example, also be a passive coupler that couples a free-space beam into an attached optical fiber, or vice versa.

In a specially advantageous embodiment of the invention, the substrate comprises a photonic integrated circuit with an input and/or an output that is coupled to the second waveguide. The second waveguide may then be part of the substrate and therefore be fixed relative to it. In such a setting, the invention greatly simplifies the integration of lasers, photodetectors and optical amplifiers into photonic integrated circuits. The photonic integrated circuit on the one hand and the laser, photodetector or optical amplifier on the other hand may then be fabricated separately and with different semiconductor fabrication techniques that are not compatible with each other. They can then be assembled to form the desired apparatus, exploiting the simplified alignment brought about by the invention.

However, it is not mandatory that the second waveguide be part of the substrate. In other embodiments, the substrate may, for example, be a "dumb" substrate that contains support structures but no optical elements. For example, the substrate may contain an array of support structures akin to a breadboard for the quick setup of electronic circuits. A first subset of the support structures may then engage with one or more recesses and stop areas on a first photonic device comprising the first waveguide, and a second subset of the support structures may engage with one or more recesses and stop areas on a second photonic device comprising the second waveguide. By bringing the stop areas of both photonic devices in contact with their corresponding stop surfaces on the support structures of the substrate, the waveguides of both photonic devices can then be aligned automatically along the axis C. This is convenient especially for quick test setups, where much time is typically spent on alignment and may accelerate die and/or device sorting in a manufacturing flow.

In a further specially advantageous embodiment of the invention, the substrate has a cavity into which the photonic device is at least partially insertable. On the one hand, this saves space. On the other hand, in a further specially advantageous embodiment of the invention, there is an optical path from the first waveguide through an edge of the photonic device, and there is an optical path from the second waveguide through an edge of the substrate. For example, the first waveguide may terminate in an edge of the photonic device, while the second waveguide may terminate in an edge of the substrate. The edge of the photonic device and the edge of the substrate face each other when the photonic device is inserted into the cavity. Both waveguides can then be directly coupled across the gap between the two edges, exploiting the improved alignment with respect to the axis C brought about by the invention.

In a further specially advantageous embodiment of the invention, the second waveguide forms part of the substrate. The stop surface of the support structure on the substrate is planar, with a plane that is aligned along the axis C to within 1 µm, preferably to within 500 nm, of a parallel plane that separates the core of the second waveguide from its cladding, or separates one of its cladding layers from another cladding layer. Likewise, in another specially advantageous embodiment of the invention, the stop area of the photonic device is planar, with a plane that is aligned along the axis C to within 1 µm, preferably to within 500 nm, of a parallel plane that separates the core of the first waveguide from its cladding, or separates one of its cladding layers from another cladding layer, or separates a light emitting layer inside the core from the remainder of the core.

The inventors have found that such alignments can be manufactured very easily by etching the substrate, resp. the photonic device, and using the planes that separate different materials as natural etch stops. A fine alignment can be performed, for example, by adding some material after the etching, or by continuing the etching beyond the etch stop. The term "etch stop" does not dictate in a strict sense that the etching will grind to a halt upon reaching the etch stop. Rather, it means that the speed of the etching will be slowed down significantly when the first material has been etched through and the etchant has to attack the second material that is more resistant to this etchant. As the speed of the etching slows down, it becomes easier to tune a timed etch to exactly the required depth.

In a specially advantageous embodiment of the invention, the thickness of the core layer of the second waveguide is between 70% and 140% of the thickness of the core layer of the first waveguide, each measured along the axis C. This allows for an efficient bidirectional coupling between the two waveguides. It also simplifies fabrication because the interfaces between the cores of the two waveguides and their immediately adjacent cladding layers will suffice as etch stops for the fabrication. Assuming symmetrical optical modes relative to the center plane of the cores, this maximizes optical coupling. Restricting the thickness of the core layer of the second waveguide to be between 90% and 110% of the thickness of the core layer of the first waveguide results in even better coupling.

Preferably, measured along the axis C, the thickness of the core of the second waveguide differs by no more than 200 nm from the thickness of the core 101 of the first waveguide. At typical wavelengths for telecommunication applications, this will maximize coupling efficiency.

Preferably, the substrate comprises silicon and/or a dielectric. In photonic integrated circuits based on these substrates, the need to integrate light sources, photodetectors and similar photonic devices is most prevalent.

In a further advantageous embodiment of the invention, an edge of the photonic device in which the first waveguide terminates, and/or an edge of the substrate in which the second waveguide terminates, is angled with respect to the perpendicular cross section of the first waveguide core resp. of the second waveguide core. In the apparatus assembled from the photonic device and, e.g., a PIC chip with waveguide 200a as substrate, light emitted from one waveguide core propagates as a free beam to the edge in which the other waveguide core is terminated. Some reflection will inevitably occur at this interface between air and the second waveguide core. An angled edge prevents this reflection from being coupled back into the waveguide core from which it was emitted. This is especially advantageous if the photonic device is a laser or a semiconductor optical amplifier, both of which are very sensitive to back-reflections.

The inventors have also developed a method to fabricate an apparatus according to the invention. The main feature of this method is that the recess is formed by etching of the photonic device, and/or the support structure is formed by etching of the substrate. This etching process is selective with respect to at least one interface between two materials in the photonic device and/or in the substrate.

In an advantageous embodiment of the invention, the two materials are chosen from the materials of the core layer, a light emitting layer inside the core layer, an electrical cladding layer inside the core layer and/or a cladding layer, that form part of the first waveguide of the photonic device. The choice of the interface depends on the difference in thicknesses between the cores of the first waveguide and the second waveguide, measured along the axis C: For each configuration of thicknesses, there is an optimum alignment of both waveguides against each other along the axis C. With the general teaching of the invention in hand that a given alignment can be precisely set by providing an appropriate etch stop, the skilled person can set the optimum alignment for every configuration. For example, the thicknesses of one or more cladding layers may be varied to this effect.

Preferably, either during the etching of the photonic device, the core layer of the first waveguide is removed, or during the etching of the substrate, the core layer of the second waveguide is removed. This will simplify the alignment especially for flip-chip assemblies that comprise a photonic device and a substrate.

Preferably, during fabrication of the core layer, light emitting layer inside the core layer, electrical cladding layer inside the core layer, and/or a cladding layer, that forms part of the first waveguide of the photonic device, this layer is extended laterally to the location of the recess in the photonic device. "Extension" in this context does not imply that the layer runs contiguously from the waveguide to the location of the recess. Rather, the lateral patterning of the layer in a plane perpendicular to the axis C may be modified in a way that the layer is present not only where it is needed to form part of the first waveguide, but additionally also at the location of the recess. For example, an additional "island" of the layer may be deposited where the recess is supposed to be etched.

Likewise, alternatively or in combination, in a further advantageous embodiment of the invention, the two materials are chosen from the materials of the core layer, and/or a cladding layer, that form part of the second waveguide which in turn forms part of the substrate. Preferably, during fabrication of the core layer, and/or a cladding layer, that forms part of the second waveguide, this layer is extended laterally to the location of the support structure.

Such extension and island formation of a layer can be obtained by a variety of means, such as blanket deposition of the layer over the entire substrate/photonic device, followed by selective removal of the layer, or by selective deposition of the layer. Methods for selective deposition comprise, for example, selective area growth (SAG) of semiconductor materials. In selective area growth, a dielectric layer is locally removed, locally exposing the surface of a first semiconductor material creating a growth window in which a second semiconductor material can be locally grown. Since the thickness of layers deposited by selective area growth can depend on the size of the window, this also provides a means of adjusting the thickness of the layer in the vicinity of the recess or in the vicinity of the support structure relative to the layer thickness in the vicinity of the first or second waveguide. Since the second semiconductor material does not grow outside of the windows, it will grow faster in smaller windows due to loading effects resulting for diffusion of adsorbed reactants on the surface of the dielectric film, resulting in thicker films. This is particularly advantageous if the core layer thickness of the first waveguide differs from the core layer thickness of the second waveguide at the edge couplers, since the extended parts of the core layers can then be grown to have thicknesses in the vicinity of the mechanical alignment structures that result in perfect alignment notwithstanding the difference of the core layer thicknesses at the edge couplers. Therefore, in a further advantageous embodiment of the invention, the core layer of the first waveguide, and/or the core layer of the second waveguide, are deposited by selective area growth, and the thickness of the core layer in the vicinity of the recess is different from the thickness of the core layer in the waveguide, and/or the thickness of the core layer in the vicinity of the support structure is different from the thickness of the core layer in the waveguide.

This is an additional refinement, since usually (including other embodiments of this invention) material layers and interfaces between these layers are extended with the same layer thickness from the location of the waveguide to the areas where the recesses of the photonic device or the support structures of the substrate are to be fabricated.

In a specially advantageous embodiment of the invention, during fabrication of the first waveguide, an auxiliary cladding layer with a thickness that corresponds to a desired offset along the axis C between a boundary of the core layer of the first waveguide and a boundary of the core layer of the second waveguide is inserted between the core layer and one of the cladding layers of the first waveguide. These cladding layers may be the top and bottom cladding layers that, together with the core layer, form the first waveguide. Alternatively or in combination, in another specially advantageous embodiment of the invention, during fabrication of the second waveguide, an auxiliary cladding layer with a thickness that corresponds to a desired offset along the axis C between a boundary of the core layer of the first waveguide and a boundary of the core layer of the second waveguide is inserted between the core layer and one of the cladding layers of the second waveguide. These cladding layers may be the top and bottom cladding layers that, together with the core layer, form the second waveguide.

If the thicknesses of the PIC and FCPC core layers differ, following configurations can be used to improve the vertical alignment between the chips:

A. If the PIC core layer thickness $t_{PIC}$ is larger than the FCPC core layer thickness $t_{FCPC}$, the etch stop for the pedestal definition is at the boundary between the PIC core and upper cladding layer, and the etch stop for the recess definition is at the boundary between the FCPC core and lower cladding layer, perfect vertical alignment between the core layers of the two chips (center of layer to center of layer, as is optically relevant assuming symmetric modes) can be recovered if an additional etch depth of $(t_{PIC}-t_{FCPC})/2$ is applied to either the definition of the top pedestal surfaces or of the bottom of the recesses (or split between the two). If the modes are asymmetric, for example because of different top and bottom cladding refractive indices, different corrections have to be applied for optimum coupling.

B. If the PIC core layer thickness $t_{PIC}$ is smaller than the FCPC core layer thickness $t_{FCPC}$, the etch stop for the pedestal definition is at the boundary between the PIC core and lower cladding layer, and the etch stop for the recess definition is at the boundary between the FCPC core and upper cladding layer, perfect vertical alignment between the core layers of the two chips (center of layer to center of layer, as is optically relevant assuming symmetric modes) can be recovered if an additional etch depth of $(t_{FCPC}-t_{PIC})/2$ is applied to either the definition of the top pedestal surfaces or of the bottom of the recesses (or split between the two). If the modes are asymmetric, for example because of different top and bottom cladding refractive indices, different corrections have to be applied for optimum coupling.

C. If the etch stop for the pedestal definition is at the boundary between the PIC core and upper cladding layer, and the etch stop for the recess definition is also at the boundary between the FCPC core and upper cladding layer, perfect vertical alignment between the core layers of the two chips (center of layer to center of layer, as is optically relevant assuming symmetric modes) can be recovered if an additional etch depth of $(t_{PIC}+t_{FCPC})/2$ is applied to either the definition of the top pedestal surfaces or of the bottom of the recesses (or split between the two). If the modes are asymmetric, for example because of different top and bottom cladding refractive indices, different corrections have to be applied for optimum coupling.

An auxiliary cladding layer can be used to replace a timed etching step with which a difference in thicknesses between the two waveguide cores is to be compensated by a selective etching step that uses a boundary of the auxiliary cladding layer with another layer as a natural etch stop. For example, a top auxiliary cladding layer can be deposited or grown on top of the core layer, prior to the deposition or growth of the primary top cladding layer. Alternatively, a bottom auxiliary cladding layer can be deposited or grown on the primary bottom cladding layer, after which the core layer and top cladding layer are deposited or grown. The thin film stacks are then respectively bottom cladding layer, core layer, auxiliary top cladding layer, primary top cladding layer in the first case and primary bottom cladding layer, auxiliary bottom cladding layer, core layer, top cladding layer in the second case. The composition of the primary and auxiliary cladding layers are chosen such that an adequate etch stop occurs at their boundary. An auxiliary layer can for example be used to replace combination of an etch stop between a core and a cladding layer, followed by an additional timed etch as described in the configurations above, by an etch with an etch stop between a primary and an auxiliary cladding layer. This can be seen, for example, by comparing the configurations shown in FIGS. 3a and 3c, in which a timed etch is required to compensate for the fact that the thickness 210 of the core of the second waveguide 201 is larger than the thickness 110 of the core of the first waveguide 101, with the configurations shown in FIGS. 3d and 3e, in which such a timed etch is not required, due to the addition of an auxiliary cladding layer with an appropriate etch stop.

For example, in configuration A, if an additional depth of $(t_{PIC}-t_{FCPC})/2$ is etched into the bottom cladding of the FCPC, in which case the thickness of the FCPC auxiliary bottom cladding layer should be $(t_{PIC}-t_{FCPC})/2$. In another example, in configuration B, if an additional depth of $(t_{FCPC}-t_{PIC})/2$ is etched into the bottom cladding of the PIC, in which case the thickness of the auxiliary bottom cladding layer should be $(t_{FCPC}-t_{PIC})/2$. In a further example, in configuration C, if an additional etch of depth $(t_{PIC}+t_{FCPC})/2$ is etched into the one of the PIC and the FCPC with the thinner core layer, in which case the thickness of the auxiliary bottom cladding layer should be $(t_{PIC}+t_{FCPC})/2-\min(t_{PIC},t_{FCPC})$.

The desired offset can be brought about by an auxiliary cladding layer in the photonic device, by an auxiliary cladding layer in the substrate, or any suitable combination of the two.

Using an auxiliary cladding layer, for example, the following additional configurations may be fabricated:

D. If the PIC core layer thickness $t_{PIC}$ is larger than the FCPC core layer thickness $t_{FCPC}$, the etch stop for the pedestal definition is at the boundary between the PIC core and lower cladding layer, and the etch stop for the recess definition is at the boundary between a primary top cladding layer and an auxiliary top cladding layer, perfect vertical alignment between the core layers of the two chips (center of layer to center of layer, as is optically relevant assuming symmetric modes) can be recovered if the thickness of the FCPC auxiliary top cladding layer is $(t_{PIC}-t_{FCPC})/2$. If the modes are asymmetric, for example because of different top and bottom cladding refractive indices, different corrections have to be applied for optimum coupling.

E. If the PIC core layer thickness $t_{PIC}$ is smaller than the FCPC core layer thickness $t_{FCPC}$, the etch stop for the pedestal definition is at the boundary between a primary top cladding layer and an auxiliary top cladding layer of the PIC, and the etch stop for the recess definition is at the boundary between the FCPC core and lower cladding layer, perfect vertical alignment between the core layers of the two chips (center of layer to center of layer, as is optically relevant assuming symmetric modes) can be recovered if the thickness of the FCPC auxiliary top cladding layer is $(t_{FCPC}-t_{PIC})/2$. If the modes are asymmetric, for example because of different top and bottom cladding refractive indices, different corrections have to be applied for optimum coupling.

A configuration can also be used in which the core layer was etched away in the regions of support structures (pedestals) and/or recesses during the waveguide definition on the photonic integrated circuit (PIC) on the substrate, or on the photonic device (FCPC), respectively, so that prior to the etches defining the pedestals and/or recesses a top cladding layer is in direct contact with a bottom cladding layer. For suitably chosen top and bottom cladding layers, an etch stop can be obtained at their boundary. This is then equivalent to a situation where the etch stop is chosen at the boundary between the core layer and the lower cladding layer in the configurations detailed in the Figures (since what is left is the material below said boundary), and further processing such as further etches or thin film deposition can be similarly applied, mutatis mutandis. An additional configuration occurs when an auxiliary top cladding layer deposited after device definition in the core layer is in direct contact to a bottom cladding layer in regions of pedestals and/or recesses prior to the etches for pedestal and/or recess definition in the PIC and/or photonic device (FCPC). For suitably chosen primary and auxiliary top cladding layer materials, an etch stop can then be obtained at the boundary between these two, whilst the core layer has already been removed underneath. This situation is then equivalent to an etch stopping at the boundary between the core layer and the lower cladding layer followed by the deposition of a thin film of equal thickness to the auxiliary layer thickness utilized here. Further processing can consequently be applied accordingly to the configurations detailed in the Figures, mutatis mutandis.

Since in the case of a photonic device (FCPC) comprising light emitting devices such as lasers and SOAs the core layer is typically composed of further light emitting and electrical cladding layers, an etch stop can also occur between one such electrical cladding layer and one such light-emitting layer, for example at the boundary between the topmost electrical cladding layer and the next lower light emitting layer, or a the boundary between the topmost light emitting layer and the next lower electrical cladding layer. In this case an inner core layer can be defined, located between the boundary of the topmost electrical cladding layer to the next lower light emitting layer and the boundary between the bottommost electrical cladding layer and the next upper light emitting layer in the first case, and between the boundary of the topmost light emitting layer to the next lower electrical cladding layer and the boundary between the bottommost light emitting layer and the next upper electrical cladding layer in the second case. The configurations described above can then still be applied by replacing core layer by inner core layer, mutatis mutandis.

In a further advantageous embodiment of the invention, after the etching process, an additional layer is deposited in the recess, and/or an additional layer is deposited on the support structure, with a thickness that corresponds to a desired offset along the axis C between a boundary of the core layer of the first waveguide and a boundary of the core layer of the second waveguide. The desired offset can be brought about by the additional layer in the recess, the additional layer on the support structure, or any suitable combination of the two. Because the surface of the support structure is better accessible for material to be deposited, deposition of an additional layer on the support structure with high precision may be more controllable. In any case, the thickness of a deposited layer can be controlled with high precision more easily than the depth of a timed etch.

Using an additional layer, for example, the following configurations can be fabricated:

F. If the PIC core layer thickness $t_{PIC}$ is larger than the FCPC core layer thickness $t_{FCPC}$, the etch stop for the pedestal definition is at the boundary between the PIC core and lower cladding layer, and the etch stop for the recess definition is at the boundary between the FCPC core and upper cladding layer, perfect vertical alignment between the core layers of the two chips (center of layer to center of layer, as is optically relevant assuming symmetric modes) can be recovered if a film of thickness $(t_{PIC}-t_{FCPC})/2$ is deposited at the bottom of the recesses after the etch into the FCPC defining the bottom of the recesses, on the top of the pedestals after the etch into the PIC defining the top of the pedestals, or the thickness split between two such films. If the modes are asymmetric, for example because of different top and bottom cladding refractive indices, different corrections have to be applied for optimum coupling.

G. If the PIC core layer thickness $t_{PIC}$ is smaller than the FCPC core layer thickness $t_{FCPC}$, the etch stop for the pedestal definition is at the boundary between the PIC core and upper cladding layer, and the etch stop for the recess definition is at the boundary between the FCPC core and lower cladding layer, perfect vertical alignment between the core layers of the two chips (center of layer to center of layer, as is optically relevant assuming symmetric modes) can be recovered if a film of thickness $(t_{FCPC}-t_{PIC})/2$ is deposited at the top of the pedestals after the etch into the PIC defining the top of the pedestals, at the bottom of the recesses after the etch into the FCPC defining the bottom of the recesses, or the thickness split between two such films. If the modes are asymmetric, for example because of different top and bottom cladding refractive indices, different corrections have to be applied for optimum coupling.

H. If the etch stop for the pedestal definition is at the boundary between the PIC core and lower cladding layer, and the etch stop for the recess definition is also at the boundary between the FCPC core and lower cladding layer, perfect vertical alignment between the core layers of the two chips (center of layer to center of layer, as is optically relevant assuming symmetric modes) can be recovered if a film of thickness $(t_{FCPC}+t_{PIC})/2$ is deposited at the top of the pedestals after the etch into the PIC defining the top of the pedestals, at the bottom of the recesses after the etch into the FCPC defining the bottom of the recesses, or films with split thicknesses applied to the two chips. If the modes are asymmetric, for example because of different top and bottom cladding refractive indices, different corrections have to be applied for optimum coupling.

Preferentially, the photonic device comprises several semiconductor thin films and the etch selectivity between two such semiconductor thin films is used to provide an etch stop at the boundary of said two semiconductor thin films for the fabrication of the recess. Etch selectivity is defined as the property of the etching process to be able to etch a first material at a significantly higher etch rate than a material located immediately below it (the etch stop layer). This property is used to stop the etching process precisely at the interface between the two materials. In an advantageous embodiment of the invention, the etching is slowed down by at least a factor of 3, preferably by at least a factor of 5, upon or before reaching the interface. An etch selectivity of more than 5:1 already improves the precision of a timed etch. Excellent selectivities of better than 100:1 can be achieved with wet chemical etches and isotropic dry etches without ion milling.

Two etch stop boundaries are particularly advantageous: The boundaries between the core layer and either one of the cladding layers are particularly useful, as using them for stopping an etch does not require adding additional layers to the material stack. As such, chips can be fabricated in existing fabrication flows with minimal modifications.

After reaching the etch stop, an etch into the next layer can continue for some small to moderate depth either by continuing the same etch for some appropriate time (for small or moderate etch selectivities), or by switching the etch chemistry or the type of etching (preferred for very high etch selectivities). In the second case, the accuracy of the total etch depth only depends on the precise timing of the second etch, as the depth of the first etch is near to perfect by nature of the high selectivity at the etch stop. Since the second etch is much shallower, this results in a high precision. Even in the first case, the accuracy of the total etch depth is much better than without the etch stop. Since the etch significantly slows down after reaching the second layer, the accuracy of the total etch depth is here too essentially a percentage of the depth of the second, shallow etch, rather than being a percentage of the total etch depth. In addition, end point detection such as secondary ion mass spectrometry (SIMS) or plasma optical emission spectroscopy can be used inside the etcher to detect the transition from one layer to the next and improve the timing of the etch.

Continuing the etch can, for example, be advantageous to compensate for thickness differences between the optical cores of the first waveguide and the second waveguide, measured along the axis C, that are too large to be tolerated for optical alignment. To the same end, one or more auxiliary cladding layers can be added between a core of a waveguide and a cladding layer by which it is conventionally bounded.

Etch selectivities play an important role in the definition of the recess and of the support structure. Depending on the etch method and the etch chemistries, typical etch selectivities that can be obtained are better than 5:1, 10:1, 20:1, 50:1, 100:1, 200:1, 500:1 or even 1000:1 and better. The etching of Silicon with gas phase $XeF_2$ has for example a selectivity of better than 1000:1 relative to $SiO_2$. Also the more standard Si-etch process using $HBr:O_2$ chemistry provides an etch selectivity of >100:1 between Si and $SiO_2$.

In a typical laser diode, the center of the mode is between 1 to 5 µm below the surface. This means that the depth of the recess is also typically between 1 to 5 µm, since the photonic device etch stop is typically either at the top or bottom boundary of the waveguide core layer, within the waveguide core layer or at the boundary of an auxiliary cladding layer that is usually not more than 1 µm thick (and typically even less than 500 nm). In a substrate containing a typical photonic integrated circuit (PIC), the total thickness of the top cladding layer(s) is typically between 1 to 5 µm, so that the stop surface of the support structures (top of the pedestals) is also typically 1 to 5 µm below the surface plane of the PIC chip. The total height of the pedestals is typically between 3 to 40 µm, to leave enough space for an adhesive, epoxy or bump bonds between the photonic device and the bottom of the cavity in the PIC chip (substrate) on the one hand, while resulting in a sufficiently low thermal resistance for good heat sinking of light emitting devices on the other hand. Additional etches to refine the bottom of the recess (stop area) or the top of the pedestal (stop surface) applied after the etch stop are usually shallow, with etch depths not more than a micrometer (and typically less than 500 nm), since deep etches also result in increased variability of the etch depth and lead to reduced vertical placement accuracy. Similarly, deposited layers used to adjust the depth of the recesses or the height of the pedestals are usually not more than 1 µm thick, and typically less than 500 nm thick. The bottom of the recess is then usually within 1 µm of the top or bottom surface of the photonic device (FCPC)'s waveguide core layer, and typically even within 500 nm of the top or bottom surface of the photonic device (FCPC)'s waveguide core layer. The top of the pedestal is also usually within 1 µm of the top or bottom surface of the PIC's waveguide core layer, and typically even within 500 nm of the top or bottom surface of the PIC's waveguide core layer. In a preferred embodiment, the waveguide core layers of the PIC chip and of the photonic device (FCPC) are chosen to have a thickness difference of less than 200 nm, optional etches applied to either chip after the etch stop are less than 200 nm deep, and layers optionally deposited on either chip to adjust the height of the pedestals or the depth of the recesses are also less than 200 nm thick.

A typical PIC technology consists in silicon-on-insulator (SOI) based silicon photonics, in which waveguides are defined in the silicon device layer of the SOI material. In such a technology platform, a top $SiO_2$ cladding can for example be selectively removed from a silicon waveguide core layer with wet or vapor phase hydrofluoric acid (HF), or a silicon device layer can be selectively removed with gas phase $XeF_2$ with a high selectivity relative to an underlying $SiO_2$ layer, with other gas phase Fluor based chemistry, wet or vapor phase etching with KOH or tetramethylammonium hydroxide (TMAH). Deposition of an intermediate layer on top of the silicon waveguide core layer, such as silicon nitride (SiN), silicon oxi-nitride (SiON), aluminum nitride (AlN) or tentalum oxide prior to deposition of a primary top $SiO_2$ cladding layer can serve as an auxiliary cladding layer to correct for different thicknesses of the waveguide core layers in the photonic device (FCPC) and in the PIC chip (substrate).

A further example of a typical PIC technology consists in waveguides with a SiN or SiON core layer, deposited on top of $SiO_2$ and overclad with a further $SiO_2$ layer. Here, etch selectivities between SiN or SiON and $SiO_2$ can also be utilized for precise pedestal definition. Phosphoric acid (in particular hot phosphoric acid) for example etches SiN and SiON faster than $SiO_2$ with a good selectivity (up to 80:1). Also dry-etch chemistries are known (e.g. $CF_4:O_2:N_2$) that provide a good enough selectivity of >10:1 between SiN or SiON and $SiO_2$.

It is understood that the top of the PIC or photonic device (FCPC) refers to the surface close to which the photonic devices are implemented on a given chip, in particular the surface on or close to which the edge coupler that couples light to or from the other chip is implemented. In particular, the top surface of the photonic device (FCPC) refers to the surface that is top before the photonic device (FCPC) has been flipped. This does not prevent further devices to be implemented on the other surface(s) of the chip(s). The PIC and the photonic device (FCPC) may each comprise more than one edge coupler wherein pairs of edge couplers each comprising one edge coupler of the PIC and one edge coupler of the photonic device (FCPC) transmit light between each other. It is further understood that descriptions referring to the stop surface of a support structure (top of a pedestal) or the stop area (bottom) of a recess to be below a boundary between thin films by a certain amount, refers to the position of said boundary prior to the etch defining the support structure or recess (since the boundary is actually etched away in the position of the support structure or recess, in this case). Same considerations hold in respect to the stop surface of a support structure (top of a pedestal) or the stop area (bottom) of a recess being at the bottom surface of a thin film: They are located at the location of the bottom surface of the thin film before it was etched away by the etch defining the stop surface of the support structures (top of the pedestals) or the stop area (bottom) of the recesses.

Edge couplers may simply be open ends of waveguide cores that terminate in an edge of a chip. They may, however, also be enhanced with further structures to further improve the efficiency of the coupling between waveguide cores.

The fabrication of the cavity and of the support structures (pedestals) on the PIC can follow several fabrication flows. In one fabrication flow, a lithographic step selectively exposes the footprint of the cavity, minus the footprint of the support structures (pedestals), to an etch. After etching to the bottom of the cavity, the etch mask is removed from the support structures (pedestals), and the height of the support structures (pedestals) reduced according to a configuration described above or according to a further configuration. In an alternate fabrication flow, a first etch reaches the PIC etch stop described above. In a following step, the top of the support structures (pedestals) are protected from further etches after which a second etch is used to reach the bottom of the cavity. Optionally deposited thin films increasing the height of the support structures (pedestals) can be deposited at different times in the process flow, for example after the first and before the second etch, or after the second etch.

Furthermore, additional etches used to further reduce the height of the support structures (pedestals) can be applied after the first etch, but before the lithographic step for the second etch, or after the second etch and applied to both the cavity and the support structures (pedestals). As an intermediate or final process step, areas at the bottom of the cavity are metallized to form the metal traces/metal surfaces. A lift-off process may be applied for the latter.

DESCRIPTION OF THE DRAWINGS

Further advantageous embodiments will now be illustrated by means of drawings without limiting the scope of the invention. The Figures show:

FIG. 4: Preventing back-reflection into a waveguide core by means of angled edges.

FIG. 1 shows a photonic device (FCPC) 300 being attached to a substrate 400 that contains a photonic integrated circuit (PIC) according to the prior art. Here, the coupling is achieved in two steps. For the case of a light-emitting device 300 such as a laser diode chip, the light propagating in the core 301 of the waveguide 300a of the emitting FCPC 300 is first emitted into a freely propagating beam 351 via an edge 322 of the FCPC 300. This beam is then coupled into the core 401 of the waveguide 400a of the PIC chip 400 via an edge 422 of this chip 400. For the case of a light-receiving FCPC chip 300, such as a waveguide photodiode, the coupling sequence is reversed, i.e., the light propagating in the core 401 of the waveguide 400a of the PIC chip 400 is first emitted into a freely propagating beam 351. This beam is then coupled into the core 301 of the waveguide 300a of the photodiode chip 300. The gap between the edge 322 of the FCPC 300 and the edge 422 of the PIC chip 400 in which the freely propagating beam 351 propagates can be backfilled with a material such as an optical epoxy.

Figure 1:
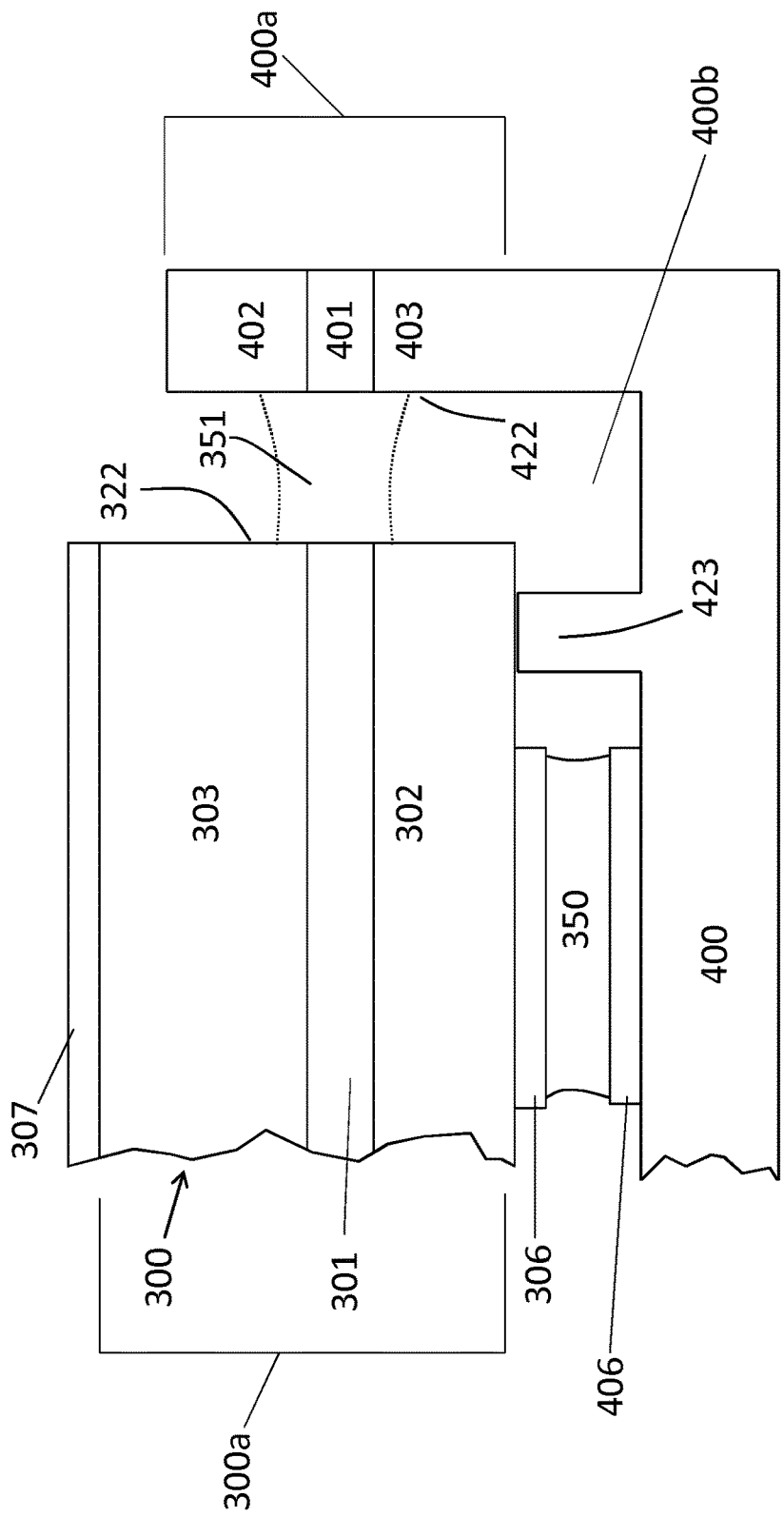
FIG. 1: Alignment of a photonic device with a substrate according to the prior art.

In the waveguide 300a of the FCPC 300, the core 301 is bounded by a top cladding layer 302 and a bottom cladding layer 303. In the waveguide 400a of the PIC chip 400, the core 401 is bounded by a top cladding layer 402 and a bottom cladding layer 403. Note that the top cladding layer 302 of the FCPC 300 is drawn below the core 301 in FIG. 1 because the FCPC 300 has been turned upside down after fabrication. When the FCPC 300 was fabricated, the bottom cladding layer 303, the core 301 and the top cladding layer 302 were grown on a wafer 360 (not shown) in this order.

Power is supplied to the photonic device 300 by means of an electrical bottom contact 307 and an electrical top contact 306 of the photonic device 300. Note that there is typically also some wafer material 360 between the bottom cladding layer 303 of the photonic device 300 and the electrical bottom contact 307 that is not shown in the Figure.

The PIC chip 400 has a cavity 400b in which the FCPC 300 has been at least partially inserted. The FCPC 300 has entered this cavity 400b until it hit a stop on top of the pedestal 423. In the configuration shown in FIG. 1, the waveguide core 301 of the FCPC 300 is aligned with the waveguide core 401 of the PIC chip 400. This alignment is secured by conductive epoxy or a solder bump 350 that fills the gap between the electrical top contact 306 of the FCPC 300 and the cavity contact 406 at the bottom of the cavity 400b.

The drawback of this prior art is that due to the fabrication inaccuracies in the height of the pedestal 423 and in the thicknesses of the upper cladding layer 302 and the electrical top contact 306 of the FCPC 300, the vertical alignment (with respect to the axis C) between the waveguide 300a core 301 and the waveguide 400a core 401 is difficult to predetermine.

Figure 2C:
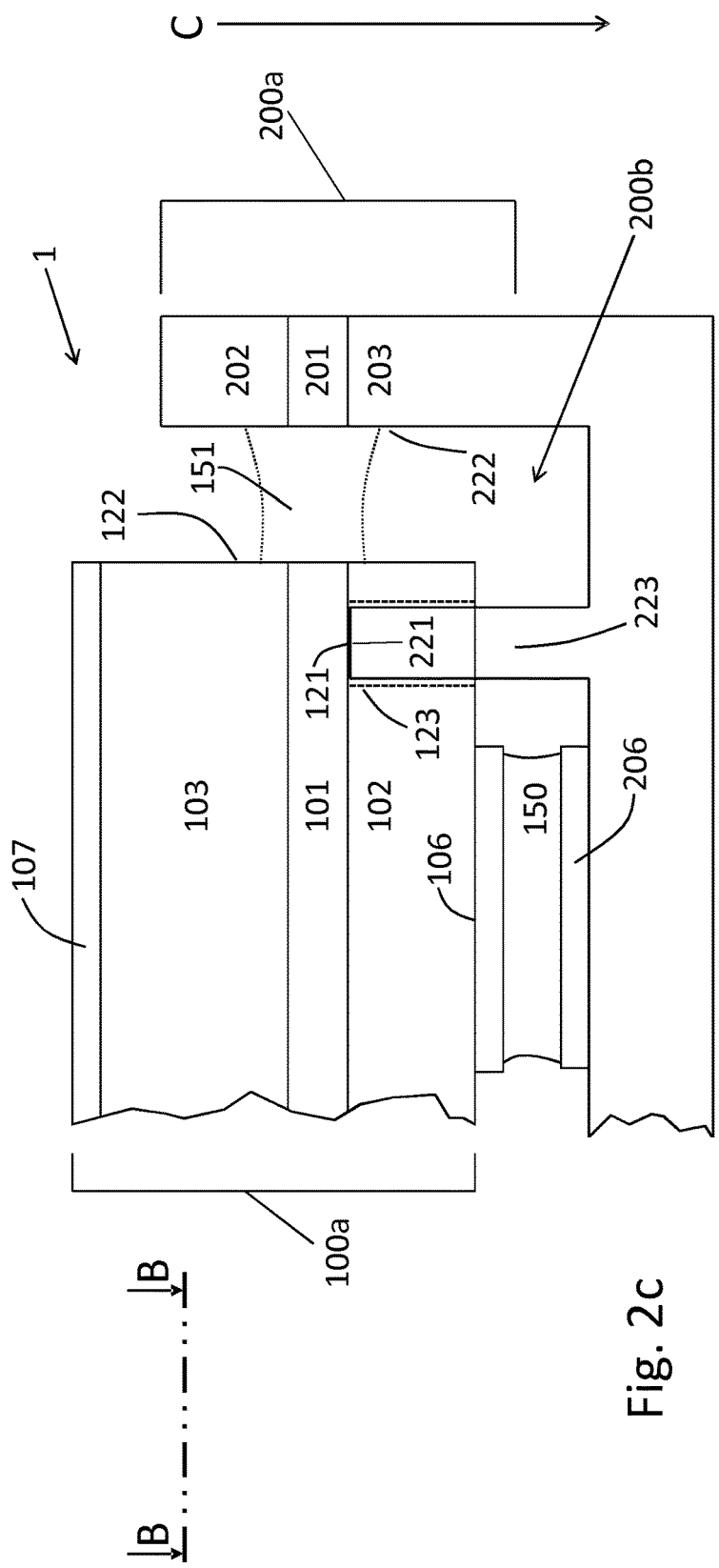
FIG. 2: Alignment of a photonic device with a substrate according to the invention.

FIG. 2 shows the improved alignment in an apparatus 1 according to the invention. FIG. 2a shows a top view. FIG. 2b shows a sectional view along the axis A. FIG. 2c shows another sectional view along the axis B. The axis C runs into the drawing plane from the top in FIG. 2a; consequently, in FIGS. 2b and 2c, it runs from top to bottom. Note that the labeling of "top" and "bottom" for layers and electrodes of the FCPC 100 is again reversed compared with layers and electrodes of the PIC chip 200 because the FCPC 100 has been turned upside down in the assembly of the apparatus 1—hence the term "flip-chip technology".

Referring first to FIG. 2a, the photonic device (FCPC) 100, a laser diode in this embodiment, sits on top of the PIC chip 200 that serves as the substrate. Four stop areas 121 on the photonic device 100 are in engagement with four corresponding stop surfaces 221 that belong to the PIC chip 200. This engagement provides for the alignment of the waveguide core 101 of the FCPC 100 with the waveguide core 201 that forms part of the PIC chip 200. The waveguide core 101 terminates in an edge 122 of the FCPC 100; the waveguide core 201 that forms part of the PIC chip 200 terminates in an edge 222 of the PIC chip 200. This edge 222 is a side wall of a cavity 200b into which the FCPC 100 has been partially inserted. Both edges 122 of the FCPC 100 and 222 of the PIC chip 200 face each other. Light emitted from the waveguide core 101 of the FCPC 100 is first converted into a freely propagating beam 151 that is then coupled into the waveguide core 201. Details of the different cladding layers of the waveguides 100a and 200a have been omitted in FIG. 2a for clarity.

Electrical power is supplied to an electrical bottom contact 107 of the FCPC 100 via lines 209a that originate at bond pads 207a on the substrate 200. The return path is via the solder bump or conductive epoxy 150 between an electrical top contact 106 of the FCPC 100 (not visible in FIG. 2a) and a cavity contact 206 at the bottom of the cavity 200b. From there, the return path is continued via lines 209b to bond pads 207b on the substrate 200.

The lateral positioning of the FCPC 100 relative to the PIC chip 200 in the A-B plane (the drawing plane of FIG. 2a, perpendicular to the axis C) was controlled by a conventional overlay marker based alignment procedure with an accuracy better than one of ±1 µm, ±1.5 µm or ±2 µm depending on the type of edge coupler utilized and the accuracy of the flip-chip bonder (the higher the required accuracy, the more expensive the machine, the lower the throughput and the yield). Since the alignment in the A-B plane is far less critical than the alignment along the axis C with the right choice of edge couplers, this accuracy is sufficient for an efficient coupling of the waveguide cores 101 and 201.

Referring now to FIG. 2b, more details about the fabrication of the apparatus 1 become apparent. The waveguide core 101 of the FCPC 100 is bounded by a top cladding layer 102 and by a bottom cladding layer 103. The bottom cladding layer 103 is plated with the electrical bottom contact 107, while the top cladding layer 102 is partially plated with the electrical top contact 106. FCPC 100 was produced from a wafer 160. Note that there is typically also some wafer material 160 between the bottom cladding layer 103 of the photonic device 100 and the electrical bottom contact 107 that is not shown in the Figure.

During the lateral patterning of the waveguide core 101 in a plane perpendicular to the axis C, the material of the waveguide core 101 has been deposited not only where it is needed for that waveguide core 101. Rather, it has also been deposited in the locations 101a of the recesses 123 that have later been etched into the top cladding layer 102. For this etching, an etchant was used that attacks the material of the top cladding layer 102, but not the material of the waveguide core 101. In the locations 101a of the recesses 123, the boundary between this material and the material of the top cladding layer 102 has therefore served as a natural etch stop. The surface of the waveguide core material at locations 101a was exposed by the etching and therefore forms the bottom of the recesses 123, as well as the stop areas 121. The corresponding support structures 223 have been fabricated by means of lithography and etching as pedestals that stand on the bottom of the cavity 200b of the PIC chip 200.

Referring now to FIG. 2c, additional details about the fabrication of the support structures 223 become apparent. If the stop surface 221 on top of the pedestals 223 is extended to the right-hand side, it is notable that it is flush with the interface between the bottom cladding layer 203 and the core 201 of the waveguide 200a on the PIC chip 200. This is the result of another selective etching process. During the lateral patterning of the waveguide 200a core 201, the material of this core 201 was not only deposited in the location of the core 201, but also in the locations of the pedestals 223. Selective etching of this material later exposed the tops of the pedestals 223 as stop surfaces 221.

Since the height of the pedestals was therefore aligned to an interface of the waveguide core 201 and the corresponding depth of the recesses 123 was aligned to an interface of the waveguide core 101, there is a natural alignment between the two waveguide cores 101 and 201 for maximum coupling efficiency.

Note that there is typically also a wafer material 160 between the bottom cladding layer 103 of the photonic device 100 and the electrical bottom contact 107 that is not shown in the Figure.

FIG. 3 shows various ways of aligning differently sized waveguide cores 101 and 201 for maximum coupling by exploiting suitable interfaces between different materials as etch stops for the definition of the stop area 121 on the photonic device 100 and/or for the definition of the stop surface 221 on the substrate 200. The substrate 200 carries the second waveguide 200a with the core 201, which is to be aligned to the core 101 of the first waveguide 100a. With the exception of the configurations shown in FIGS. 3i, 3j and 3k, during fabrication of the photonic device 100, all material layers and interfaces between these layers 101, 102, 103, 104 have been extended with the same layer thicknesses from the location of the waveguide 100a to the area where the recess 123 with its stop area 121 is to be fabricated. Likewise, during fabrication of the substrate 200, all material layers and interfaces between layers 201, 202, 203, 204 have been extended with the same layer thicknesses from the location of the waveguide 200a to the area where the support structure 223 with its stop surface 221 is to be fabricated.

Therefore, an alignment of the layers 101 and 201 that is set in the area where the stop area 121 is in engagement with the stop surface 221 will be present in the area where the actual waveguides 100a and 200a are coupled to each other as well. For clarity, the layers are labeled in FIG. 3 with the same reference numerals as in the actual waveguides 100*a* and 200*a*. The dash pointed line that runs from left to right in FIGS. 3*a*-3*k* represents the final common level of the stop area 121 and the stop surface 221, measured along the axis C.

The photonic device 100 and the substrate 200 are drawn in the final flip-chipped orientation, i.e., the top cladding layer 102 of the photonic device 100 is facing down, while the top cladding layer 202 of the substrate 200 is facing up.

All the examples in FIG. 3 assume symmetric modes in the waveguides 100*a* and 200*a* for simplicity. If the modes are asymmetric, for example because of different refractive indices in top 102, 202 and bottom 103, 203 cladding layers, the alignment needs to be modified accordingly for optimum coupling between the waveguide cores 101 and 201.

Referring first to FIG. 3*a*, column a.1) represents the initial state of the photonic device 100. The waveguide core 101 of the photonic device 100 has a far smaller thickness 110 than the thickness 210 of the waveguide core 201 of the PIC chip (substrate) 200. The core 101 is bounded by a top cladding layer 102 on one side and by a bottom cladding layer 103 on the other side.

The photonic device 100 is subjected to an etching step 111 that starts from the surface 120 of the top cladding layer 102 and proceeds through this top cladding layer 102 as well as through the core layer 101 before stopping at the interface between the core layer 101 and the bottom cladding layer 103. A recess 123 is formed; its bottom is the stop area 121.

Column a.2) shows the final result. Etching step 111 may also be divided into a first sub-step that selectively removes the top cladding layer 102 and a second sub-step that selectively removes the core layer 101. For the example, different etch chemistries and/or different etch processes may be used for these two sub-steps. Either or both of these etch steps may be terminated by an etch stop.

Column b.1) represents the initial state of the substrate 200. The waveguide core layer 201 is bounded by a top cladding layer 202 on the one side and by a bottom cladding layer 203 on the other side.

Starting from a surface 220 of the top cladding layer 202, the substrate is subjected to a first etching step 211 that selectively removes the top cladding layer 202. Column b.2) shows the intermediate result obtained after this first etching step 211. To align the center of the waveguide core 101 with the center of the waveguide core 201, in a second etching step 212, the core layer 201 is further etched by means of a timed etch that removes one half of the difference between the layer thickness 210 of the core layer 201 and the layer thickness 110 of the core layer 101. This correction for different core layer thicknesses 110 and 210, which is made solely on the side of the substrate 200 in this embodiment, may alternatively be done in part on the side of the photonic device 100 and in part on the side of the substrate 200, or may be fully done on the side of the photonic device 100.

Column b.3) shows the final result. The stop surface 221 is the top of a support structure 223 that has the form of a pedestal. Its lower part is made of bottom cladding layer 203 material, while its upper part is made out of the remaining core layer 201 material.

It should be noted that the etch 212 applied to the substrate 200 can be replaced by an etch of equal depth applied instead to the photonic device 100 after the etch 111. Alternatively, the etch depth of the etch 212 can be reduced and an additional etch applied to the photonic device 100 after the etch 111, with an etch depth corresponding to the amount by which the etch 212 has been reduced (i.e., the etch 212 is split over the substrate 200 and the photonic device 100).

Referring now to FIG. 3*b*, the layer thicknesses 110 and 210 of the core layers 101 resp. 201 are reversed compared with FIG. 3*a*. Consequently, the etching step 111 for the photonic device 100 is changed so that it stops at the interface between the top cladding layer 102 and the core layer 101. The first, selective etching step 211 for the substrate is changed so that it stops at the interface between the core layer 201 and the bottom cladding layer 203. The second, timed etching step 212 proceeds again for half of the difference between the layer thicknesses 110 and 210, but into the bottom cladding layer 203. If the stop area 121 according to column a.2) is brought into engagement with the stop surface 221 according to column b.3), the waveguide core 201 is exactly centered in the cross section of the larger waveguide core 101.

It should be noted that the etch 212 applied to the substrate 200 can be replaced by an etch of equal depth applied instead to the photonic device 100 after the etch 111. Alternatively, the etch depth of the etch 212 can be reduced and an additional etch applied to the photonic device 100 after the etch 111, with an etch depth corresponding to the amount by which the etch 212 has been reduced (i.e., the etch 212 is split over the substrate 200 and the photonic device 100).

Referring now to FIG. 3*c*, this starts out from the same initial situation as shown in FIG. 3*a*. However, the fabrication is modified in that the etching step 111 applied to the photonic device 100 only proceeds up to the interface between the top cladding layer 102 and the core layer 101. Consequently, the second, timed etching step 212 applied to the substrate 200 proceeds through the core layer 201 for a distance that corresponds to the mean of the two layer thicknesses 110 and 210.

It should be noted that the etch 212 applied to the substrate 200 can be replaced by an etch of equal depth applied instead to the photonic device 100 after the etch 111. Alternatively, the etch depth of the etch 212 can be reduced and an additional etch applied to the photonic device 100 after the etch 111, with an etch depth corresponding to the amount by which the etch 212 has been reduced (i.e., the etch 212 is split over the substrate 200 and the photonic device 100).

Figure 3D:
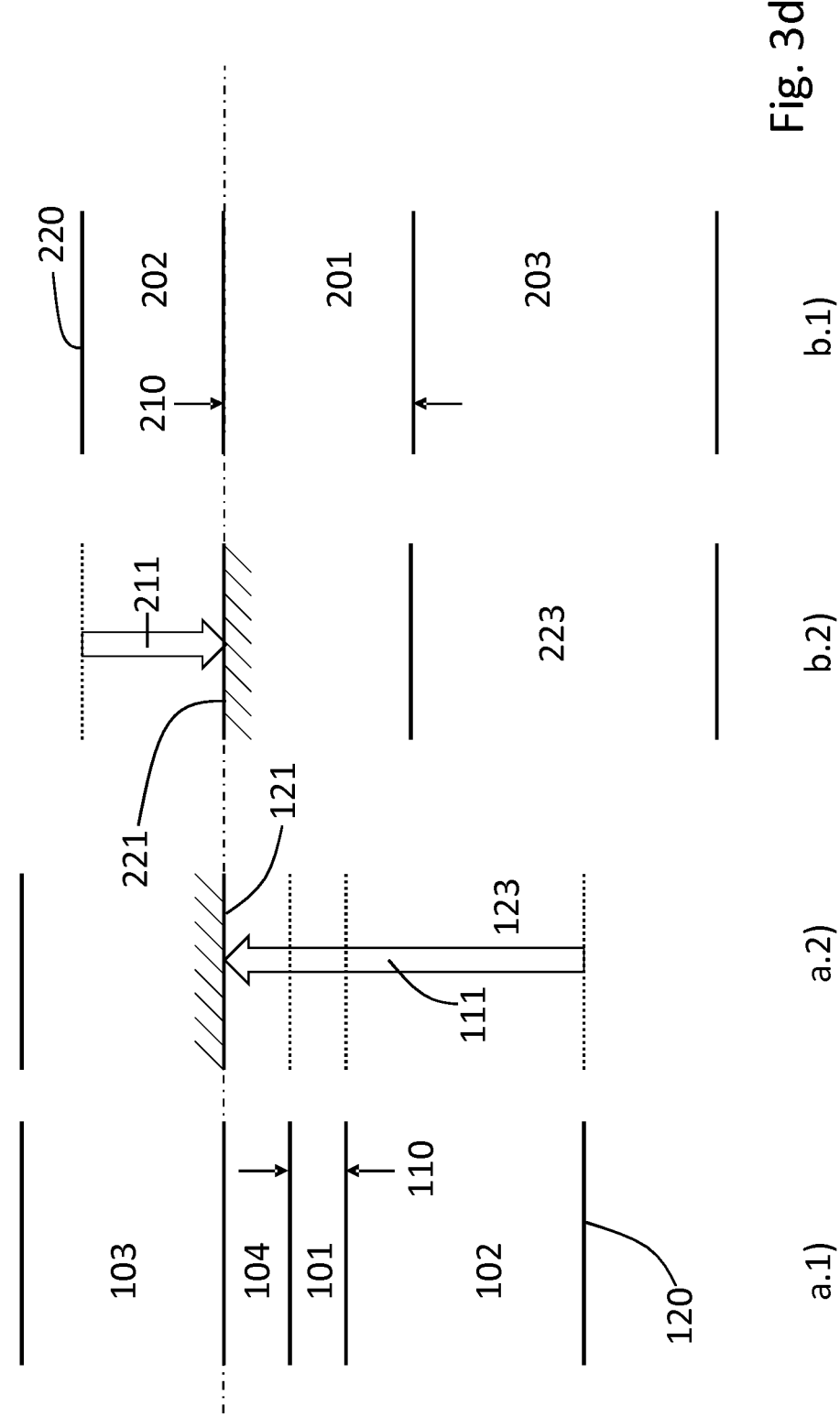
FIG. 3: Tuning of the alignment according to the invention to thickness differences between the first and second waveguides.

Referring now to FIG. 3*d*, this starts out from an initial situation similar to FIG. 3*a*. The difference is that an auxiliary cladding layer 104 has been inserted between the core layer 101 and the bottom cladding layer 103 during fabrication of the first waveguide 100*a*. This auxiliary cladding layer 104 has a thickness that corresponds to the depth of the second etching step 212 used in FIG. 3*a*. The etching step 111 for the photonic device 100 is adapted so that it removes not only the top cladding layer 102 and the core layer 101, but also the auxiliary cladding layer 104.

The removal of the auxiliary cladding layer 104 replaces the second timed etching step 212 of the substrate 200 that is used in FIG. 3*a*. Since the deposition of thin films is controllable with a great deal of accuracy, this may make the final alignment between the waveguide cores 101 and 201 more controllable than by using the timed etching step 212.

It should be noted that in the case where layer 201 is thinner than layer 101, a similar configuration to FIG. 3*d* can be implemented, wherein an auxiliary bottom cladding layer 204 is implemented below the core layer 201 of the substrate instead of the auxiliary layer 104 of the photonic device, wherein the etch 111 stops at the top interface of the core layer 101, and wherein the etch 211 stops at the bottom interface of the auxiliary layer 204 (i.e., the layer configurations and etch depths are interchanged between the photonic device and the substrate relative to FIG. 3d).

Referring now to FIG. 3e, this starts out from an initial situation similar to FIG. 3b. The difference is that an auxiliary cladding layer 204 has been inserted between the core layer 201 and the top cladding layer 202 during fabrication of the second waveguide 200a of the substrate 200. This auxiliary cladding layer 204 has a thickness that corresponds to the depth of the timed etching step 212 used in FIG. 3b. The auxiliary cladding layer 204 replaces this timed etching step 212 because the selective etching step 211 now stops at the interface between this auxiliary cladding layer 204 and the top cladding layer 202 and the etch 111 stops at the interface between the core layer 101 and the bottom cladding layer 103, which already brings the waveguide cores 101 and 201 to the correct alignment.

It should be noted that in the case where layer 201 is thicker than layer 101, a similar configuration to FIG. 3e can be implemented, wherein an auxiliary top cladding layer 104 is inserted between the core layer 101 and the top cladding layer 102 of the photonic device instead of the auxiliary layer 204 of the substrate, wherein the etch 111 stops at the top interface of the auxiliary layer 104, and wherein the etch 211 stops at the bottom interface of the core layer 201 (i.e., the layer configurations and etch depths are interchanged between the photonic device and the substrate relative to FIG. 3e).

Referring now to FIG. 3f, this process is identical to the process shown in FIG. 3c as far as the photonic device 100 is concerned. However, instead of removing only part of the core layer 201 on the substrate 200 to form the stop surface 221, this core layer 201 is removed completely by the selective etching step 211. Part of it is then restored by depositing an additional layer 205 in a deposition step 213. The thickness of this additional layer 205 is one half of the difference between the core layer thicknesses 210 and 110. The final alignment obtained in this way is the same as in FIG. 3c.

It should be noted that the additional layer 205 deposited on the substrate 200 can be replaced by an additional layer of equal thickness deposited on the photonic device 100 after the etch 111. Alternatively, the thickness of the additional layer 205 can be reduced, and a further additional layer deposited onto the photonic device, wherein the thickness of the further additional layer corresponds to the amount by which the thickness of the additional layer 205 has been reduced (i.e., the thickness of the additional layers is split over the substrate and the photonic device).

Referring now to FIG. 3g, this process starts out from the same initial situation as shown in FIG. 3b. In order to replace the timed etching step 212 used in FIG. 3b, first the selective etching step 111 applied to the photonic device 100 is modified so that it removes not only the top cladding layer 102, but the whole core layer 101 as well, stopping at the interface between this core layer 101 and the bottom cladding layer 103. Then the selective etching step 211 applied to the substrate 200 is modified so that it only removes the top cladding layer 202, but not the core layer 201. Finally, in a deposition step 213, an additional layer 205 is formed with a thickness that corresponds to the etching depth of the timed etching step 212 according to FIG. 3b, i.e., to one half the difference between the layer thicknesses 110 and 210.

It should be noted that the additional layer 205 deposited on the substrate 200 can be replaced by an additional layer of equal thickness deposited on the photonic device 100 after the etch 111. Alternatively, the thickness of the additional layer 205 can be reduced, and a further additional layer deposited onto the photonic device, wherein the thickness of the further additional layer corresponds to the amount by which the thickness of the additional layer 205 has been reduced (i.e., the thickness of the additional layers is split over the substrate and the photonic device).

Figure 3H:
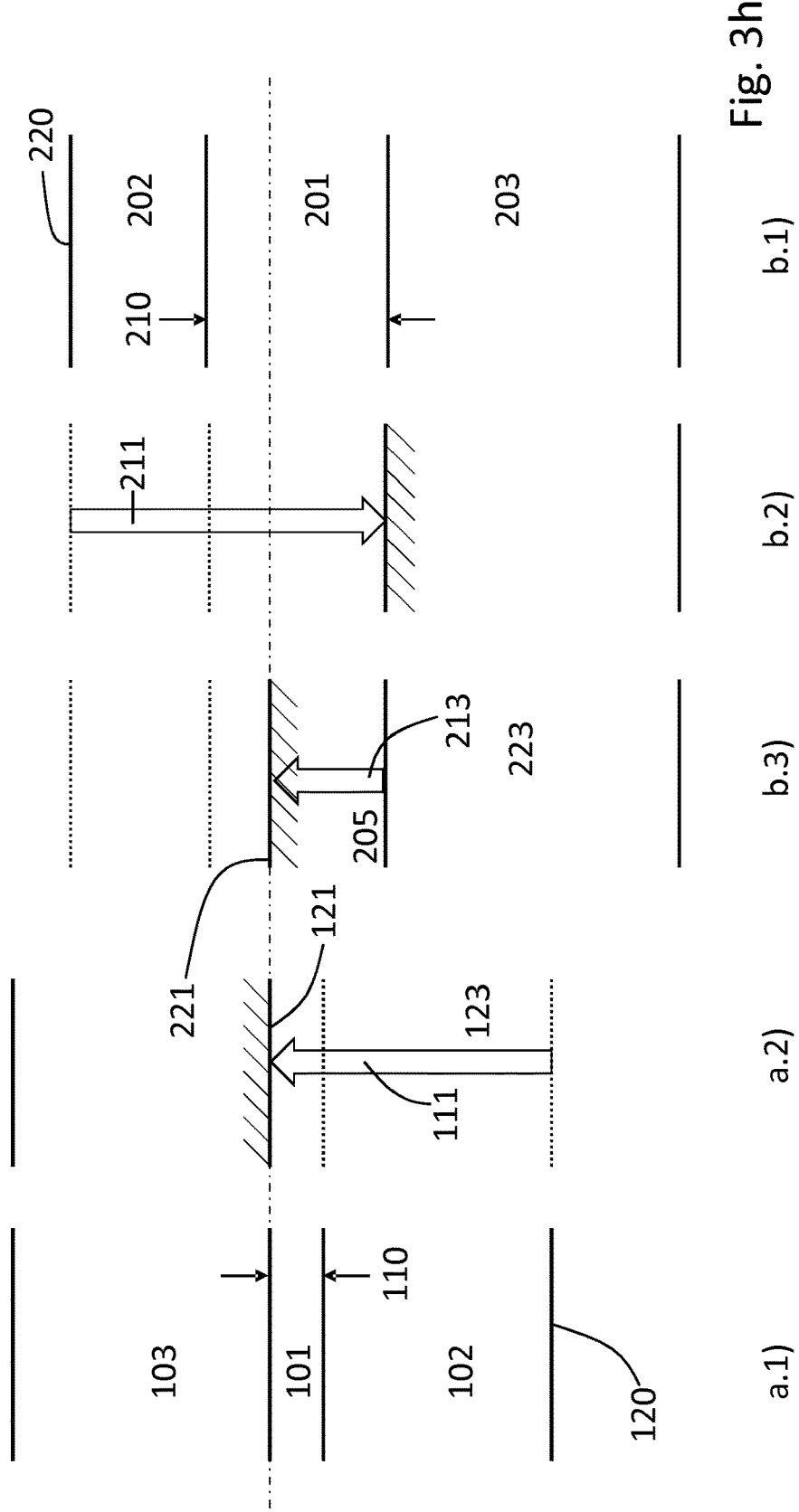

Referring now to FIG. 3h, this process is identical to the process shown in FIG. 3a as far as the photonic device is concerned. The selective etching step 211 applied to the substrate 200, however, not only removes the top cladding layer 202, but also the core layer 201. Part of it is then restored by depositing an additional layer 205 with a thickness corresponding to the mean of the two waveguide core thicknesses 110 and 210, on the support structure 223 in a deposition step 213. The final alignment obtained is the same as in FIG. 3a.

It should be noted that the additional layer 205 deposited on the substrate 200 can be replaced by an additional layer of equal thickness deposited on the photonic device 100 after the etch 111. Alternatively, the thickness of the additional layer 205 can be reduced, and a further additional layer deposited onto the photonic device, wherein the thickness of the further additional layer corresponds to the amount by which the thickness of the additional layer 205 has been reduced (i.e., the thickness of the additional layers is split over the substrate and the photonic device).

Figure 3I:
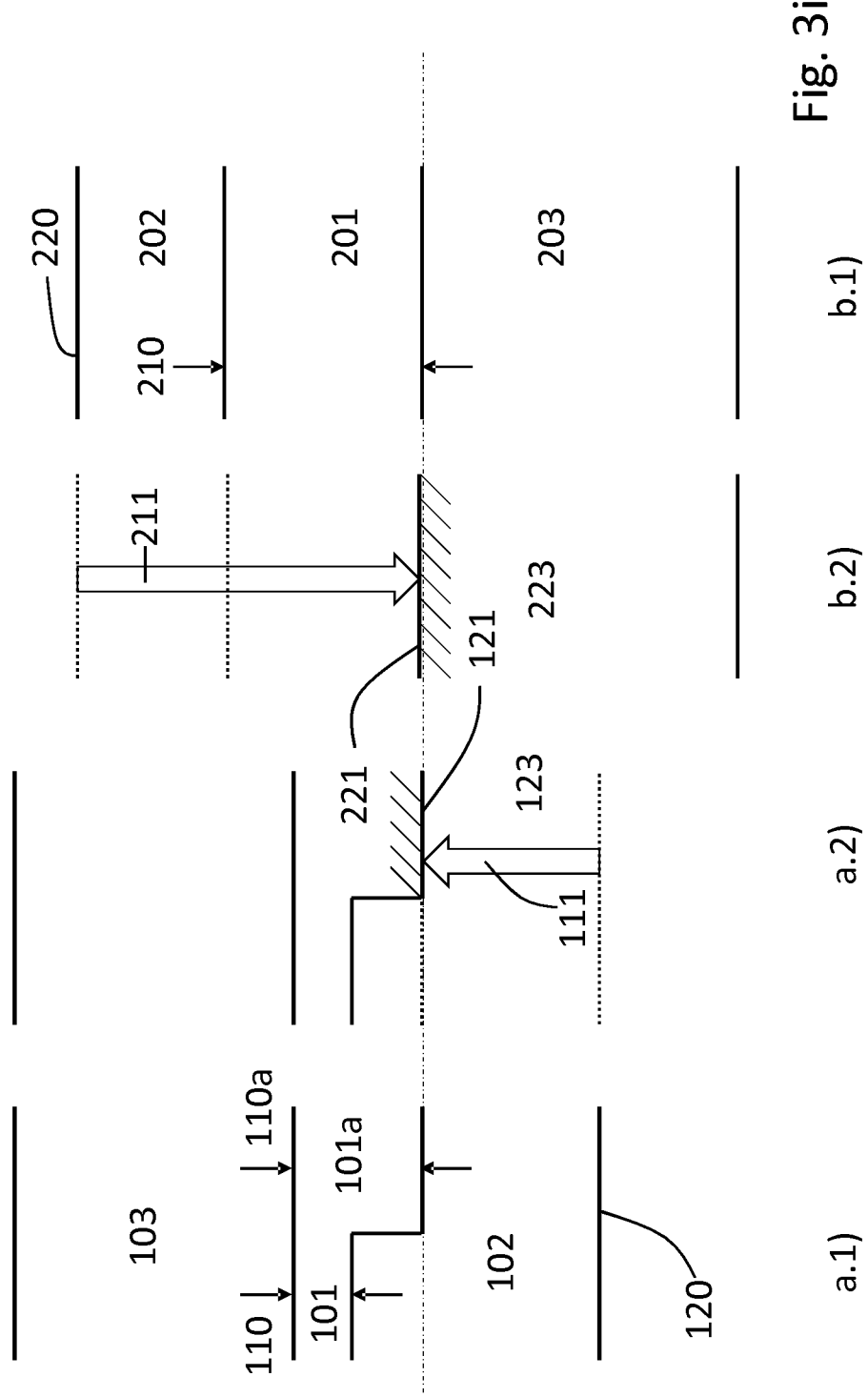
Figure 3K:
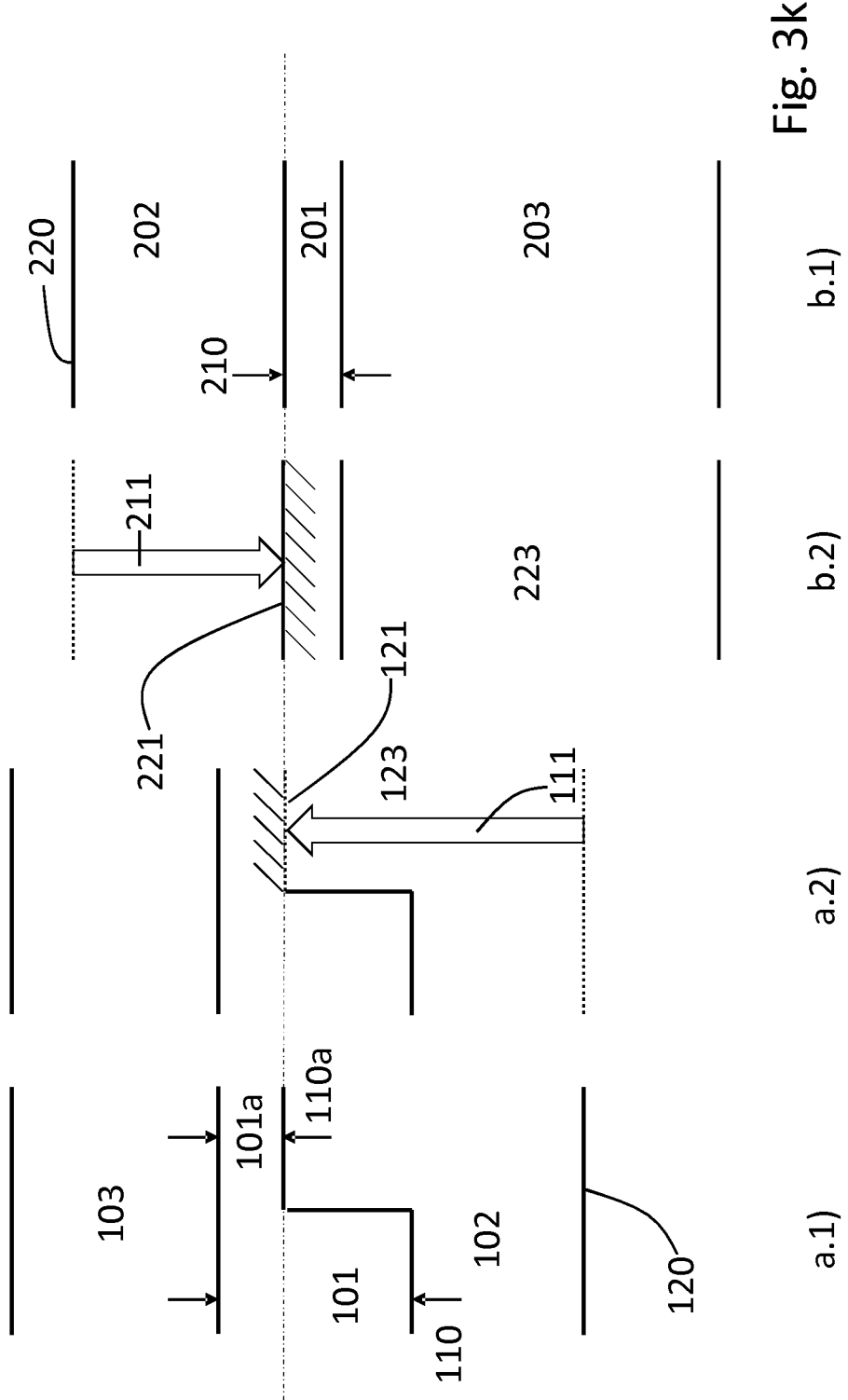

Another embodiment of the described invention consists in using local thickness variations of the core and cladding layers, i.e., the core layer thicknesses 110, 210 in the areas of waveguides 100a, 200a can be different from the core layer thicknesses 110a, 210a in the area where the alignment is made (recess 123 and support structure 223). To achieve these different core layer thicknesses, the core layers of one of or both of the photonic device 100 or the substrate 200 are grown by selective area growth (SAG) with growth areas adapted to achieve the targeted core layer thicknesses. FIGS. 3i-k illustrate the alignment using SAG on the core layer of the photonic device. However, the SAG process is also applicable to the substrate cladding (202, 203) and auxiliary cladding (204) layers, as well as the photonic device cladding (102, 103) and auxiliary cladding (104) layers, resulting in similar etch- and deposition process configurations.

Referring now to FIG. 3i, the core layer thickness 110 of the photonic device 100 in the area of the waveguide core 101 is thinner than the core layer thickness 110a in the area 101a where the recess 123 is fabricated. The core layer thickness 110 of the photonic device 100 in the area of the waveguide core 101 is also thinner than the core layer thickness 210 of the substrate. The thickness 110a of the core layer of the photonic device in the area 101a of the recess 123 is adapted such that after the selective etching step 111 applied to the photonic device stopping at the interface between top cladding layer 102 and the core layer 101a and the selective etching step 211 applied to the substrate 200 stopping at the interface between the core layer 201 and the bottom cladding 203, the center of the core layers 101, 201 in the areas of the waveguide edge couplers align, and optical power coupling between the edge couplers is maximized. This is achieved by choosing the core layer thickness 110a in the area 101a of the recess 123 of the photonic device 100 to be equal to the mean value of the core layer thickness 110 in the waveguide area of photonic device 100 and the core layer thickness 210 of the substrate 200.

Referring now to FIG. 3j, the core layer thickness 110 of the photonic device 100 in the area of the waveguide core is thicker than the core layer thickness 110a in the area 101a where the recess 123 is fabricated in the photonic device 100. The core layer thickness 110 of the photonic device 100 in the waveguide area is also thicker than the core layer thickness 210 of the substrate. The thickness 110a of the core layer of the photonic device 100 in the area 101a of the recess 123 is adapted so that after the selective etching step 111 applied to the photonic device stopping at the interface between top cladding layer 102 and core layer 101a and the selective etching step 211 applied to the substrate 200 stopping at the interface between the core layer 201 and the bottom cladding 203, the center of the core layers 101, 201 in the area of the waveguide edge couplers align, and the optical power coupling between the edge couplers is maximized. This is achieved by choosing the core layer thickness 110a in the area 101a of the recess 123 of the photonic device 100 to be equal to the mean value of the core layer thickness 110 in the waveguide area of photonic device 100 and the core layer thickness 210 of the substrate 200.

Referring now to FIG. 3k, the core layer thickness 110 of the photonic device 100 in the area of the waveguide core is thicker than the core layer thickness 110a in the area 101a where the recess 123 is fabricated in the photonic device 100. The core layer thickness 110 of the photonic device 100 in the waveguide core area 101 is also thicker than the core layer thickness 210 of the substrate. The thickness 110a of the core layer of the photonic device 100 in the area 101a of the recess 123 is adapted so that after the selective etching step 111 applied to the photonic device stopping at the interface between top cladding layer 102 and core layer 101a and the selective etching step 211 applied to the substrate 200 stopping at the interface between the top cladding layer 202 and the core layer 201, the center of the core layers 101, 201 in the area of the waveguide edge couplers align, and the optical power coupling between the edge couplers is maximized. This is achieved by choosing the core layer thickness 110a in the area 101a of the recess 123 of the photonic device 100 to be equal to one half the difference between the thickness 110 of the core layer of the photonic device 100 in the waveguide area and the thickness 210 of the core layer 201 of the substrate 200.

In FIGS. 3a-k, the thicknesses of layers 101 and 201 can be interchanged, and the process steps (etch depths, deposition thicknesses, thicknesses of auxiliary cladding layers) applied to photonic device 100 and substrate 200 for the fabrication of recesses 123 and support structures 223 interchanged, resulting in further configurations.

FIG. 4a shows the top view (in the A-B plane) of an embodiment where an edge 122a of the photonic device 100 in which the waveguide core 101 terminates is angled with respect to the perpendicular cross section 125a of this waveguide core 101. Likewise, an edge 222a of the PIC chip 200 in which the waveguide core 201 terminates is angled with respect to the perpendicular cross section 225a of this waveguide core 201. Light that is emitted from waveguide core 101 and reflected at the edge 222a is not reflected back into the waveguide core 101, but rather into the surrounding cladding layers 102, 103 where it is dissipated. Likewise, light that is emitted from waveguide core 201 and reflected at the edge 122a is not reflected back into the waveguide core 201, but rather into the surrounding cladding layers 202, 203 where it is dissipated. This embodiment is, for example, suitable for an application where the photonic device 100 is a semiconductor optical amplifier (SOA), so that there is a bi-directional propagation of light between this SOA and the PIC chip 200.

FIG. 4b shows the top view of an alternative embodiment where only the edge 222b of the PIC chip 200 in which the waveguide core 201 terminates is angled with respect to the perpendicular cross section 225b of this waveguide core 201. The edge of the photonic device 100 is flush with the perpendicular cross section 125b of the waveguide 101. Light that is emitted from the waveguide core 101 and reflected on the edge 222b is not reflected back into the waveguide core 101, but rather into the surrounding cladding layers 102, 103. This embodiment is suitable, for example, for the combination of a semiconductor laser as photonic device 100 with a PIC chip 200.

The research leading to these results has received funding from the European Union Seventh Framework Programme (FP7/2007-2013) under grant agreement n° 619591.

LIST OF REFERENCE SIGNS 1 apparatus
100, 300 photonic device (FCPC)
100a, 300a first waveguide of photonic device 100, 300
101, 301 core of first waveguide 100a, 300a
101a location of recess 123 with core 101 material
102, 302 top cladding layer of first waveguide 100a, 300a
103, 303 bottom cladding layer of first waveguide 100a
104 auxiliary cladding layer of first waveguide 100a
105 additional layer of photonic device 100
106, 306 electrical top contact of photonic device 100, 300
107, 307 electrical bottom contact of photonic device 100, 300
110 thickness of first waveguide 100a core 101
110a thickness of first waveguide core layer 101 in the area 101a of the recess 123
111 selective etching step on photonic device 100
120 surface of photonic device 100 prior to etching
121 stop area of photonic device 100
122, 122a, 122b edge of photonic device 100
123 recess of photonic device 100
125a, 125b perpendicular cross section of waveguide core 101
150 conductive epoxy or solder bump
151, 351 free beam propagation region
160, 360 wafer material of photonic device
200, 400 substrate (PIC chip)
200a, 400a second waveguide
200b, 400b cavity in substrate 200a, 400a
201a area of support structure 223 with core 201 material
202, 402 top cladding layer of second waveguide 200a, 400a
203, 403 bottom cladding layer of second waveguide 200a, 400a
204 auxiliary cladding layer of second waveguide 200a
205 additional layer of substrate 200
206, 406 cavity contact on bottom of recess 200b, 400b
207a bond pads on substrate 200 for device 100 power supply
207b bond pads for return path of device 100 power supply
209a lines for device 100 power supply
209b lines for return path of device 100 power supply
210 thickness of second waveguide 200a core 201
210a thickness of second waveguide core layer 201 in the area 201a of support structure 223
211 selective etching step on substrate 200
212 timed etching step on substrate 200
213 deposition step on substrate 200
220 surface of substrate 200 prior to etching
221 stop surfaces of substrate 200
222, 222a, 222b edge of substrate 200
223, 423 support structure (pedestal) of substrate 200, 400

225a, 225b perpendicular cross section of waveguide core 201
350 conductive epoxy or solder bump
322 edge of photonic device 300
422 edge of substrate 400
a.1) initial state of photonic device 100
a.2) state of photonic device 100 after etching step 111
b.1) initial state of substrate 200
b.2) state of substrate 200 after etching step 211
b.3) substrate 200 after etching 212 resp. deposition 213
A, B, C axes in space

The invention claimed is:
1. A method to fabricate an apparatus,
wherein the apparatus comprises
a photonic device with at least a first waveguide having a light-conducting core layer bounded by at least one cladding layer, and
at least a second waveguide having a light-conducting core layer bounded by at least one cladding layer,
wherein the first waveguide is aligned to couple with the second waveguide, wherein alignment of the first waveguide with the second waveguide with respect to at least one axis C coincides with at least one stop area of the photonic device resting on a stop surface of a corresponding support structure on a substrate, wherein the at least one stop area is a stop in a recess from a surface of the photonic device,
the method comprising:
at least one of the recess is formed by etching of the photonic device or the support structure is formed by etching of the substrate, wherein each of the etching of the photonic device and the etching of the substrate is selective with respect to at least one interface between two materials in respectively the photonic device or the substrate; and
at least one of the core layer of the first waveguide or the core layer of the second waveguide is deposited by selective area growth,
in which the selective area growth includes
removing a dielectric layer to expose at least one of a first surface of a first semiconductor material of the first waveguide or a first surface of a second semiconductor material of the second waveguide and create at least one of a growth window at the first surface of the first waveguide or a growth window at the first surface of the second waveguide, and
at least one of growing a third semiconductor material in the growth window at the first surface of the first waveguide or growing a fourth semiconductor material in the growth window at the first surface of the second waveguide,
wherein at least one of (i) a first thickness of the core layer of the first waveguide in the vicinity of the recess is different from a second thickness of the core layer in the first waveguide or (ii) a first thickness of the core layer of the second waveguide in the vicinity of the support structure is different from a second thickness of the core layer in the second waveguide.

2. The method according to claim 1, wherein the two materials are chosen from the materials of at least one of the core layer, a light emitting layer inside the core layer, an electrical cladding layer inside the core layer, or a cladding layer, that form part of the first waveguide of the photonic device.

3. The method according to claim 1, wherein either during the etching of the photonic device, the core layer of the first waveguide is removed, or during the etching of the substrate, the core layer of the second waveguide is removed.

4. The method according to claim 2, wherein during fabrication of at least one layer of the core layer, light emitting layer inside the core layer, the electrical cladding layer inside the core layer, or a cladding layer, that forms part of the first waveguide of the photonic device, the at least one layer is extended laterally to the location of the recess.

5. The method according to claim 4, wherein an auxiliary cladding layer with a thickness that corresponds to a desired offset along the axis C between a boundary of the core layer of the first waveguide and a boundary of the core layer of the second waveguide is inserted between the core layer and one of the cladding layers of said first waveguide.

6. The method according to claim 1, wherein the two materials are chosen from materials of at least one of the core layer or a cladding layer, that form part of the second waveguide which in turn forms part of the substrate.

7. The method according to claim 6, wherein during fabrication of at least one layer of the core layer, or a cladding layer, that forms part of the second waveguide, the at least one layer is extended laterally to a location of the support structure.

8. The method according to claim 7, wherein an auxiliary cladding layer with a thickness that corresponds to a desired offset along the axis C between a boundary of the core layer of the first waveguide and a boundary of the core layer of the second waveguide is inserted between the core layer and one of the cladding layers of said second waveguide.

9. The method according to claim 1, wherein at least one of an additional layer is deposited in the recess after the etching of the photonic device or an additional layer is deposited on the support structure after the etching of the substrate, with a thickness that corresponds to a desired offset along the axis C between a boundary of the core layer of the first waveguide and a boundary of the core layer of the second waveguide.

10. The method according to claim 1, wherein at least one of the etching of the photonic device or the etching of the substrate is slowed down by at least a factor of 3 upon or before reaching said at least one interface in the at least one of the photonic device or the substrate.

11. The method according to claim 1, wherein at least one of the etching of the photonic device or the etching of the substrate is slowed down by at least a factor of 5 upon or before reaching said at least one interface in the at least one of the photonic device or the substrate.

* * * * *